US008081482B2

(12) United States Patent
Loeffelholz et al.

(10) Patent No.: US 8,081,482 B2
(45) Date of Patent: Dec. 20, 2011

(54) MULTIMEDIA ENCLOSURE

(75) Inventors: Todd Loeffelholz, Minnetonka, MN (US); Mao Nian Tang, Su Qian (CN); Hai Bin Lei, Song Jiang (CN)

(73) Assignee: ADC Telecommunications, Inc., Eden Prairie, MN (US)

( * ) Notice: Subject to any disclaimer, the term of this patent is extended or adjusted under 35 U.S.C. 154(b) by 337 days.

(21) Appl. No.: 12/195,554

(22) Filed: Aug. 21, 2008

(65) Prior Publication Data
US 2009/0091898 A1 Apr. 9, 2009

Related U.S. Application Data

(60) Provisional application No. 60/957,975, filed on Aug. 24, 2007.

(51) Int. Cl.
*H05K 5/00* (2006.01)
(52) U.S. Cl. ........................................................ 361/752
(58) Field of Classification Search ........................ None
See application file for complete search history.

(56) References Cited

U.S. PATENT DOCUMENTS

| | | | |
|---|---|---|---|
| 5,267,122 A | 11/1993 | Glover et al. | |
| 5,363,440 A | 11/1994 | Daoud | |
| 5,550,916 A | 8/1996 | Daoud | |
| 5,645,449 A | 7/1997 | Sabo | |
| 5,647,045 A | 7/1997 | Robinson et al. | |
| 5,676,566 A | 10/1997 | Carlson, Jr. et al. | |
| 5,807,139 A | 9/1998 | Volansky et al. | |
| 5,947,765 A | 9/1999 | Carlson, Jr. et al. | |
| 5,982,972 A | 11/1999 | Tucker et al. | |
| 6,078,661 A | 6/2000 | Arnett et al. | |
| 6,086,414 A | 7/2000 | Tipton et al. | |
| 6,102,229 A | 8/2000 | Moncourtois | |
| 6,157,714 A | 12/2000 | Daoud | |
| 6,201,920 B1 | 3/2001 | Noble et al. | |
| 6,457,874 B1 | 10/2002 | Clapp, Jr. et al. | |
| 6,642,450 B1 | 11/2003 | Hsiao | |
| 6,788,786 B1 | 9/2004 | Kessler et al. | |
| 6,793,524 B2 | 9/2004 | Clark et al. | |
| 6,854,895 B2 | 2/2005 | Coffey et al. | |
| 6,896,547 B2 | 5/2005 | Caveney | |
| 7,105,743 B2 | 9/2006 | Caveney | |
| 2003/0174996 A1 | 9/2003 | Henschel et al. | |
| 2008/0056224 A1* | 3/2008 | Hoiness et al. | 370/342 |
| 2008/0247123 A1* | 10/2008 | Ulinskas | 361/605 |

OTHER PUBLICATIONS

International Search Report and Written Opinion mailed Feb. 4, 2009.
Admitted Prior Art as of Aug. 23, 2007, 19 pages.
Alloptic home4000™, *Alloptic, Inc.*, 4 pages (Copyright 2007).
Alloptic Xgen1000™, *Alloptic, Inc.*, 2 pages (Copyright 2007).

(Continued)

*Primary Examiner* — Jeremy Norris
*Assistant Examiner* — Tremesha S Willis
(74) *Attorney, Agent, or Firm* — Merchant & Gould P.C.

(57) ABSTRACT

A multimedia enclosure having a housing with a base, a first sidewall and a second sidewall oppositely disposed from the first sidewall. The base and the first and second sidewalls define an interior region having an optical network terminal mounting area. An optical network terminal mounting area is disposed on the base of the housing in the interior region. A first radius limiter and a second radius limiter are disposed on the second sidewall with the first and second radius limiters defining a fiber passage into the interior region.

25 Claims, 25 Drawing Sheets

OTHER PUBLICATIONS

AMN1220, 2 pages, *Hitachi Ltd.* (Publicly known at least as early as Aug. 23, 2007).
AN 5006-05, 1 page (Publicly known at least as early as Aug. 23, 2007).
AN 5006-02, 1 page (Publicly known at least as early as Aug. 23, 2007).
BLM T100 Single Family Unit ONT, Entrisphere, Inc., 1 page (Copyright 2005).
BLM T300 Multi-Dwelling Unit ONT, Entrisphere, Inc., 2 pages (Copyright 2005).
Calix 500-Series optical network terminals (ONTs), 1 page (Copyright 2006).
Calix 700-Series optical network terminals (ONTs), 1 page (Copyright 2006).
Coyote® Den Demarcation Enclosure, *Performed Line Products*, 2 pages (Copyright 2005).
Edgegate GW-482, *AFL Telecommunications*, 2 pages (Coypright 2006).
GeoStream A500 Series, *Fujitsu Limited*, 4 pages (Sep. 2002).
IEEE 802.3ah Optical Network Terminals, pp. 1-4, *Wave7 Optics* (Publicly known at least as early as Aug. 23, 2007).
ITU G.984 Optical Network Terminals, pp. 1-4, *Wave7 Optics* (Publicly known at least as early as Aug. 23, 2007).
Light Link® Direct EPON-ONU—Optical Network Unit, *Pacific Broadband Networks*, 2 pages (Copyright 1995-2007).
ONT OT900 Series, *Huawei Technologies Co., Ltd.*, 2 pages (Copyright 1998-2007).
ONT1000V Single Family Optical Network Terminal, *Motorola, Inc.*, 1 pages (Copyright 1994-2007).
Surpass hiX 57xx GPON, 16 pages (Copyright 2006).
Tellabs® 1600-631 Small Business Unit (SBU) ONT, *Tellabs*, 3 pages (Copyright 2006).
Tellabs® 1600-702 Single Family Unit (SFU) GPON ONT, *Tellabs*, 3 pages (Copyright 2007).
The AMN1220 SFU (Single Family Unit), *Hitachi, Ltd.*, 3 pages (Copyright 1994, 2007).
Trident7™ Optical Network Terminals (ONT), *Wave7 Optics*, 2 pages (Copyright 2005).

\* cited by examiner

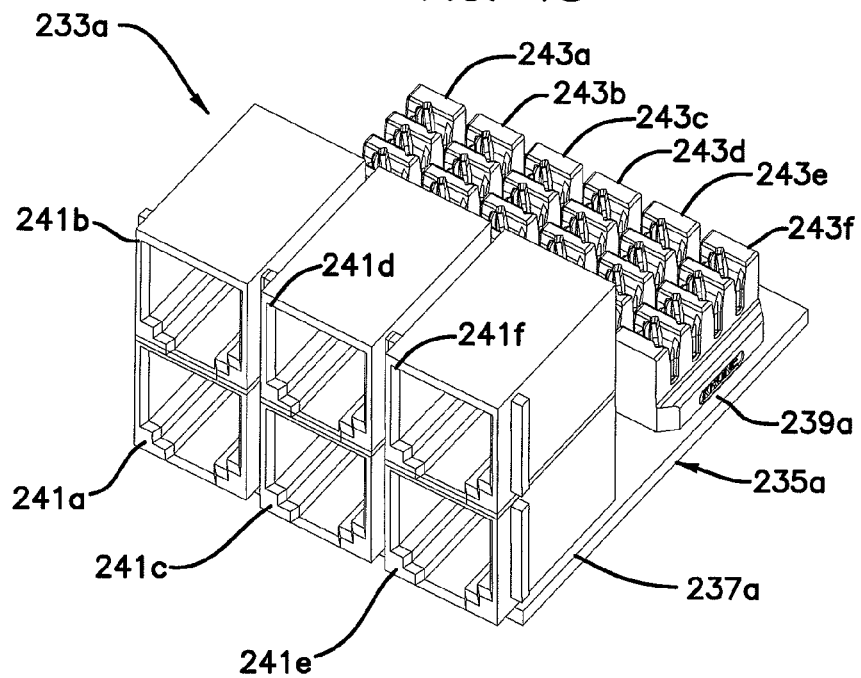
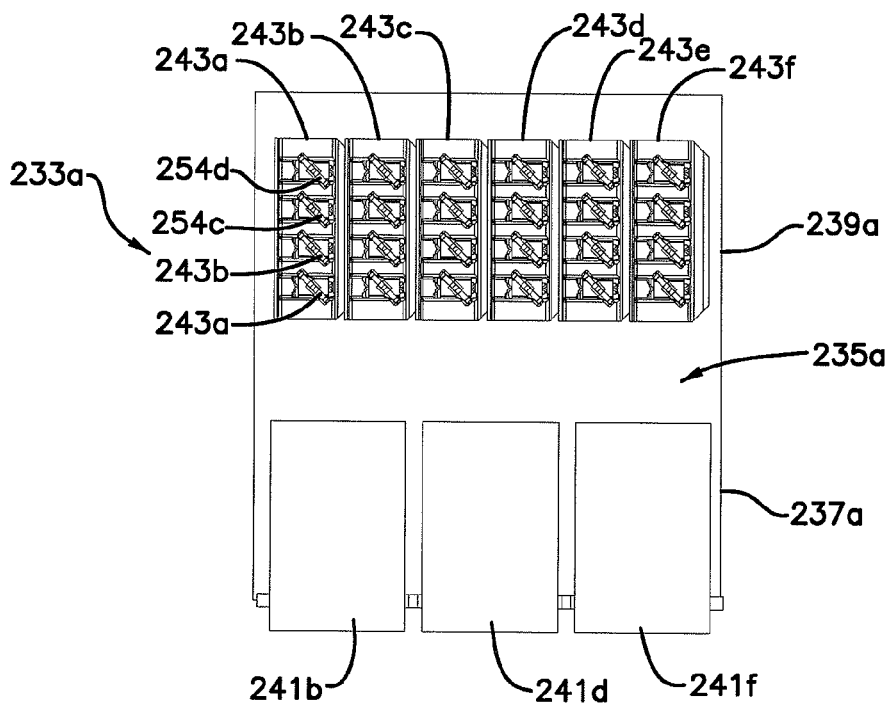

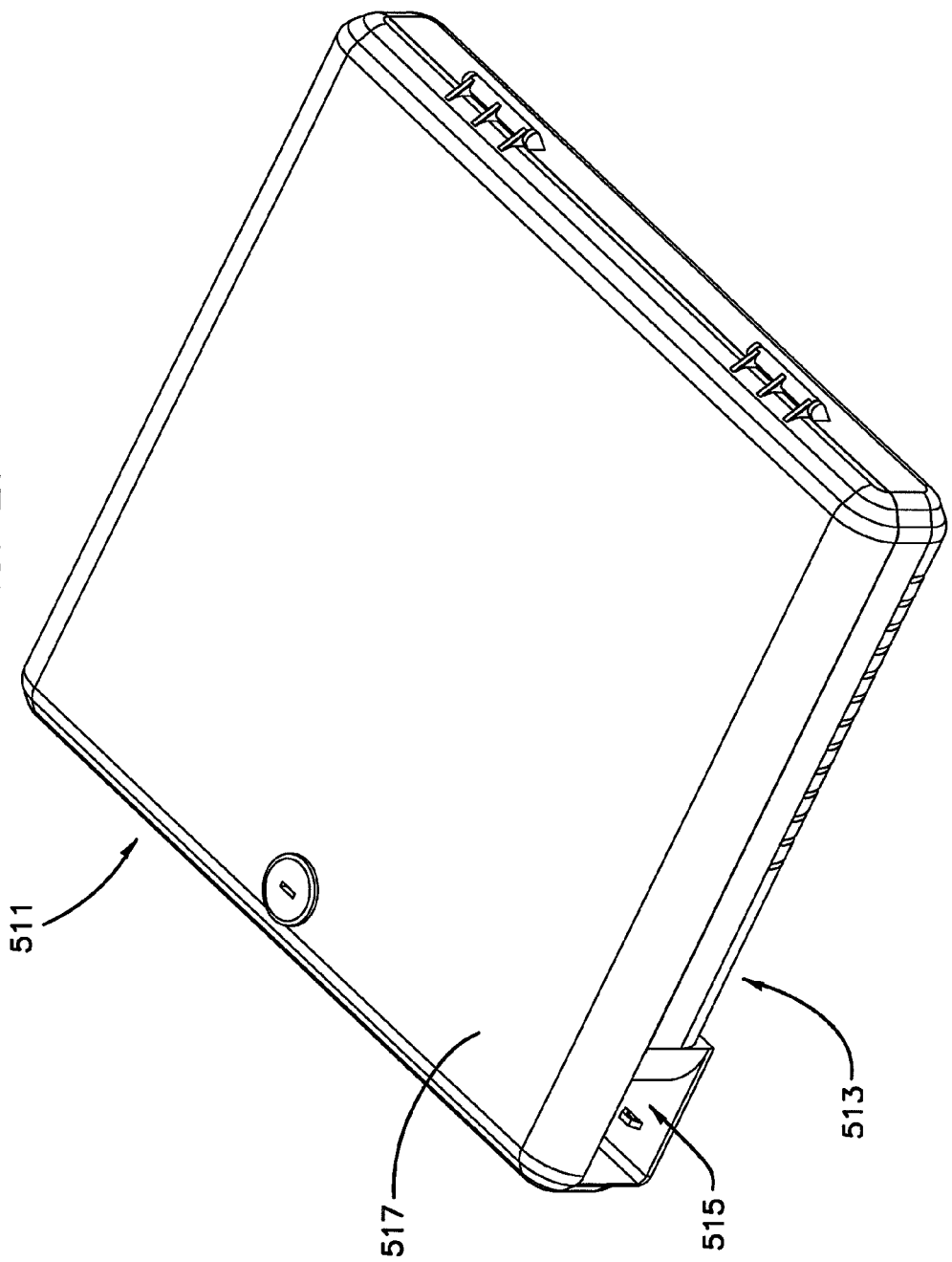

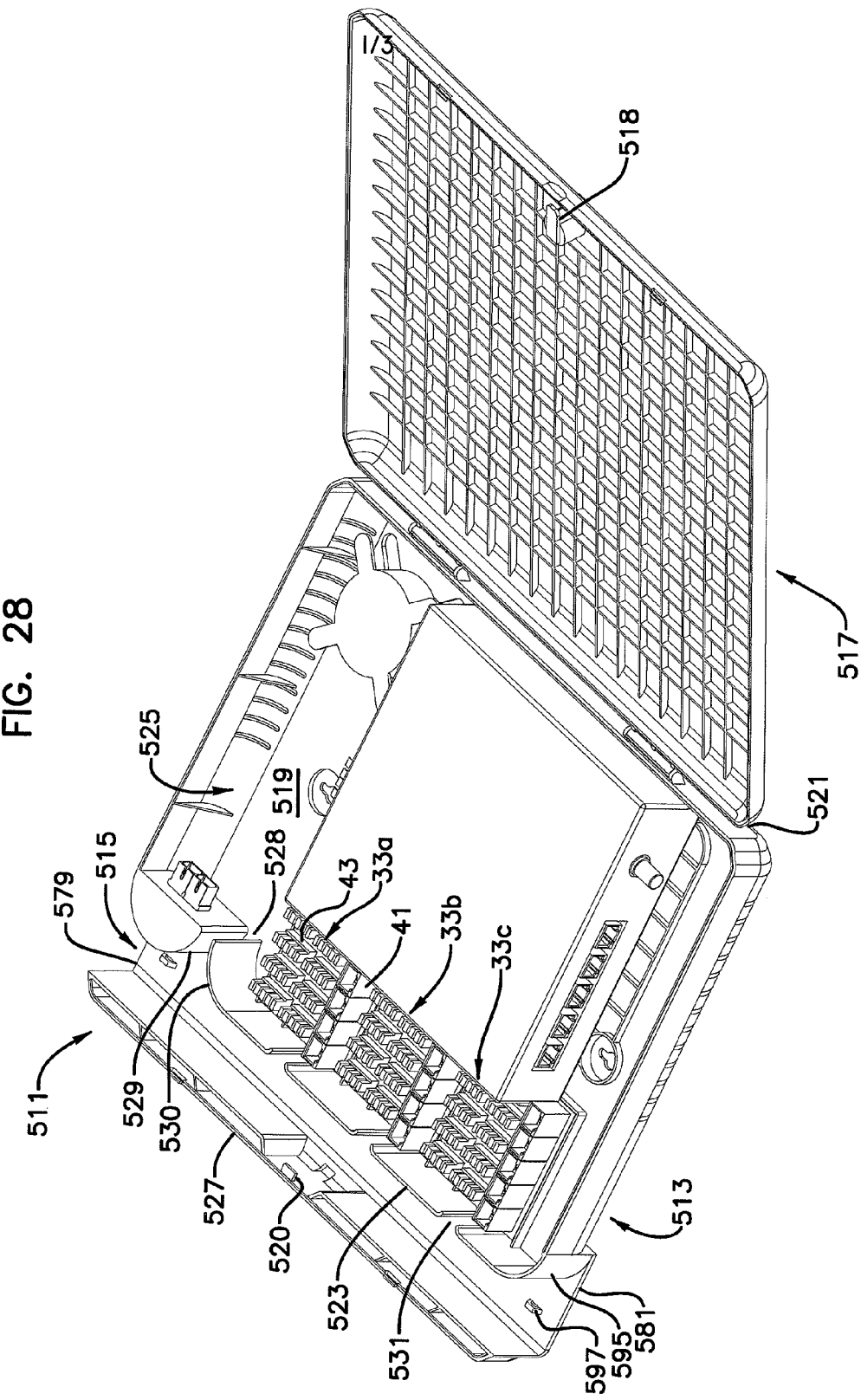

MULTIMEDIA ENCLOSURE

CROSS-REFERENCE TO RELATED APPLICATION

This application claims the benefit of U.S. Provisional Patent Application Ser. No. 60/957,975, filed Aug. 24, 2007, the disclosure of which is hereby incorporated by reference in its entirety.

TECHNICAL FIELD

The present disclosure relates to enclosures, and more particularly, to multimedia enclosures.

BACKGROUND

A telecommunication network in a residence can have a number of different configurations. For example, FIG. 1 provides a telecommunication network arranged in a daisy chain configuration. In this arrangement, a feeder cable is directed to a plurality of locations, which are in series with one another. This is the type of network configuration that is prevalent in older homes.

A telecommunication network often found in newer homes, on the other hand, is arranged in a star configuration, which is shown in FIG. 2. In this arrangement, a feeder cable is directed to a central location or hub from which a plurality of cables extends to end locations.

While these telecommunication network configurations are distinct, it is desirable for a single enclosure to be capable of housing either configuration.

SUMMARY

An aspect of the present disclosure relates to a multimedia enclosure that houses connections between fiber optic cables and copper cables. The multimedia enclosure includes a housing that defines an interior region. The housing includes a first radius limiter and a second radius limiter that define a fiber passage into the interior region of the housing.

Another aspect of the present disclosure relates to a multimedia enclosure having a housing with a base, a first sidewall and a second sidewall oppositely disposed from the first sidewall. The base and the first and second sidewalls define an interior region having an optical network terminal mounting area. A first radius limiter and a second radius limiter are disposed on the second sidewall with the first and second radius limiters defining a fiber passage into the interior region.

Another aspect of the present disclosure relates to a multimedia enclosure having a housing with a base, a first sidewall and a second sidewall oppositely disposed from the first sidewall. The base and the first and second sidewalls define an interior region having an optical network terminal mounting area. A first radius limiter and a second radius limiter are disposed on the second sidewall with the first and second radius limiters defining a fiber passage into the interior region. A termination block is disposed in the interior region of the housing. An optical network terminal is disposed in the optical network terminal mounting area of the interior region of the housing.

Another aspect of the present disclosure relates to a method for installing a multimedia enclosure. The method includes the steps of mounting a housing defining an interior region of a multimedia enclosure to a wall and routing a fiber optic cable into a cable trough, which is disposed adjacent to the interior region of the housing, of the multimedia enclosure. The fiber optic cable is routed through a fiber passage and into the interior region of the housing. The fiber passage is defined by a first radius limiter and a second radius limiter of the housing. An incoming telephony cable is routed into the cable trough and into the interior region of the housing where the incoming telephony cable is engaged to a termination block. An outgoing telephony cable, which is in communication with the incoming telephony cable, is routed from the interior region into the cable trough. An outgoing data cable, which is in communication with the fiber optic cable, is routed from the interior region into the cable trough.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and together with the description serve to further explain the principles of the disclosure. Other aspects of the present disclosure and many of the attendant advantages of the present disclosure will be readily appreciated as the present disclosure becomes better understood by reference to the following Detailed Description when considered in connection with the accompanying drawings, and wherein:

FIG. 18 is a perspective view of a first termination block of the multimedia enclosure of FIG. 16.

FIG. 19 is a front view of the first termination block of FIG. 18.

FIG. 27 is a perspective view of an alternative embodiment of a multimedia enclosure having features that are examples of aspects in accordance with the principles of the present disclosure.

FIG. 28 is a perspective view of the multimedia enclosure of FIG. 27.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
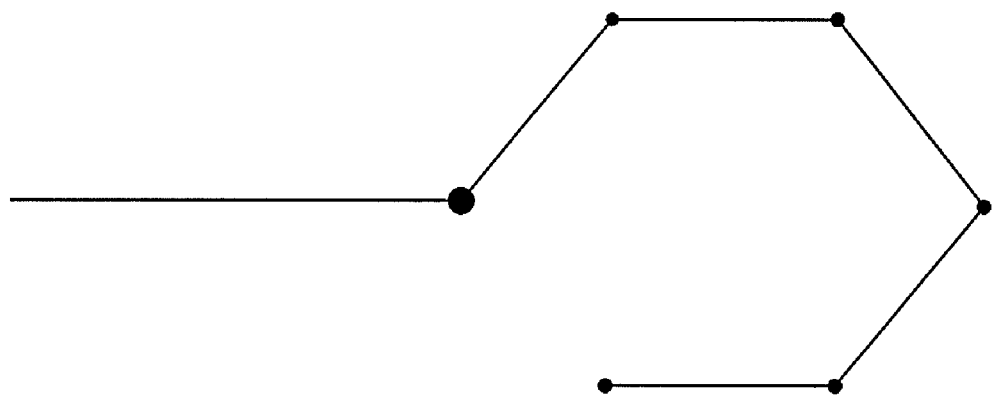
FIG. 1 is a schematic representation of a daisy chain configuration of a telecommunication network.
Figure 2:
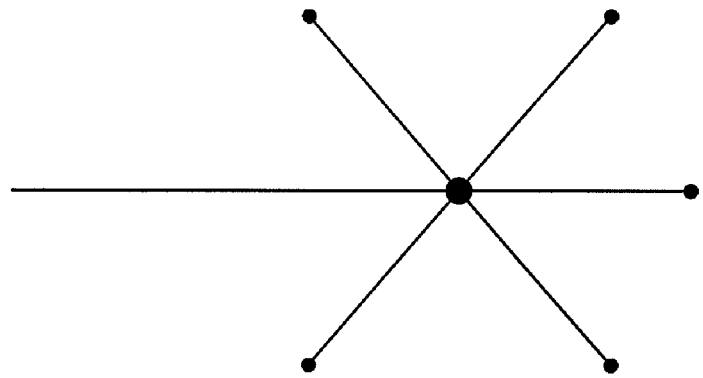
FIG. 2 is a schematic representation of a star configuration of a telecommunication network.
Figure 3:
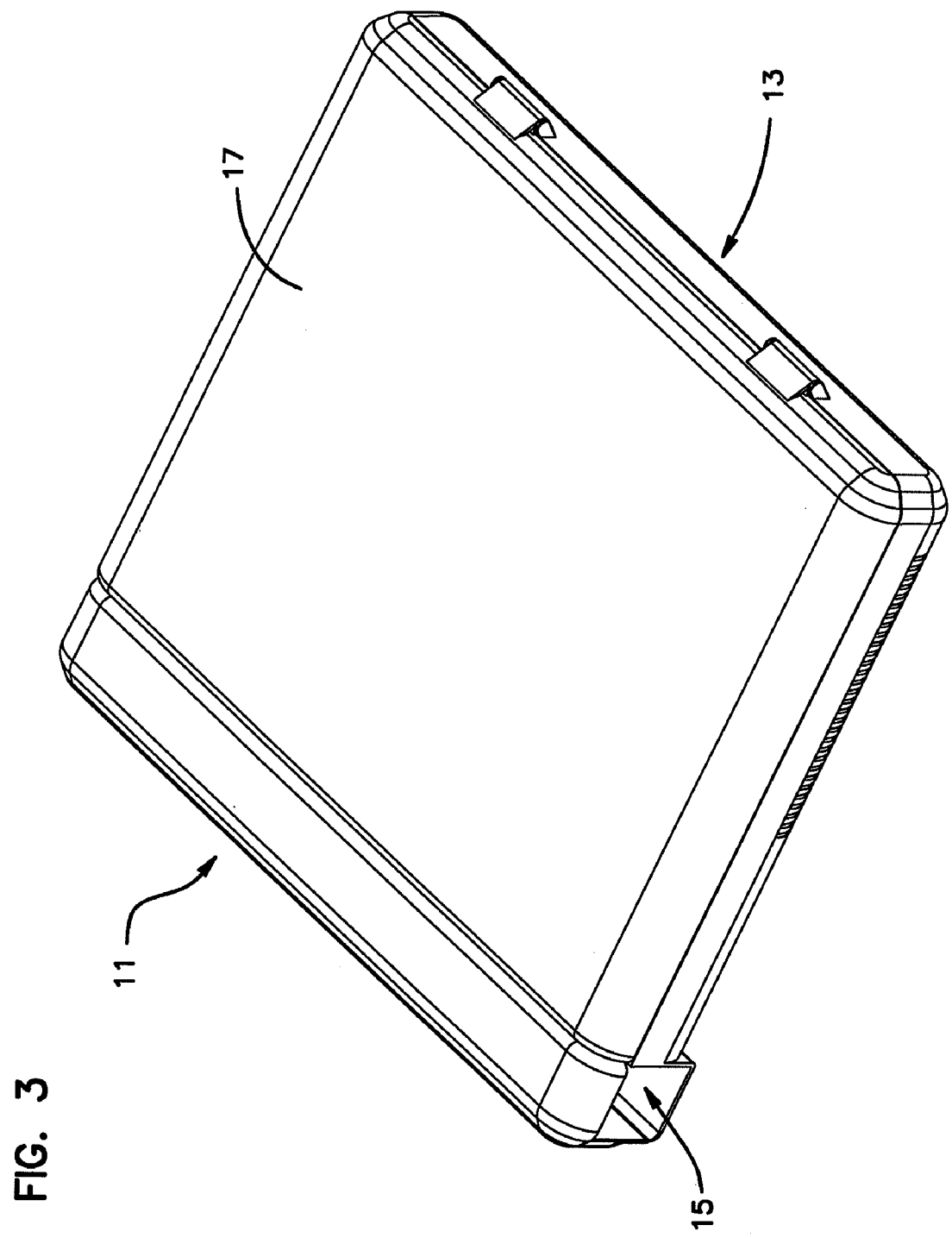
FIG. 3 is a perspective view of a multimedia enclosure having features that are examples of aspects in accordance with the principles of the present disclosure.

Referring now to FIG. 3, a multimedia enclosure, generally designated 11, is shown. The multimedia enclosure 11 encloses optical fiber connections and copper cable connections between incoming fiber optic cables and incoming and outgoing telephony, data and video cables so as to establish desired connections. While the subject embodiment of the present disclosure can be used in many different locations, the multimedia enclosure 11 of the subject embodiment will be described with regard to use in the residence of a subscriber. The multimedia enclosure 11 includes a housing, generally designated 13, a cable trough, generally designated 15, and a cover 17.

Figure 4:
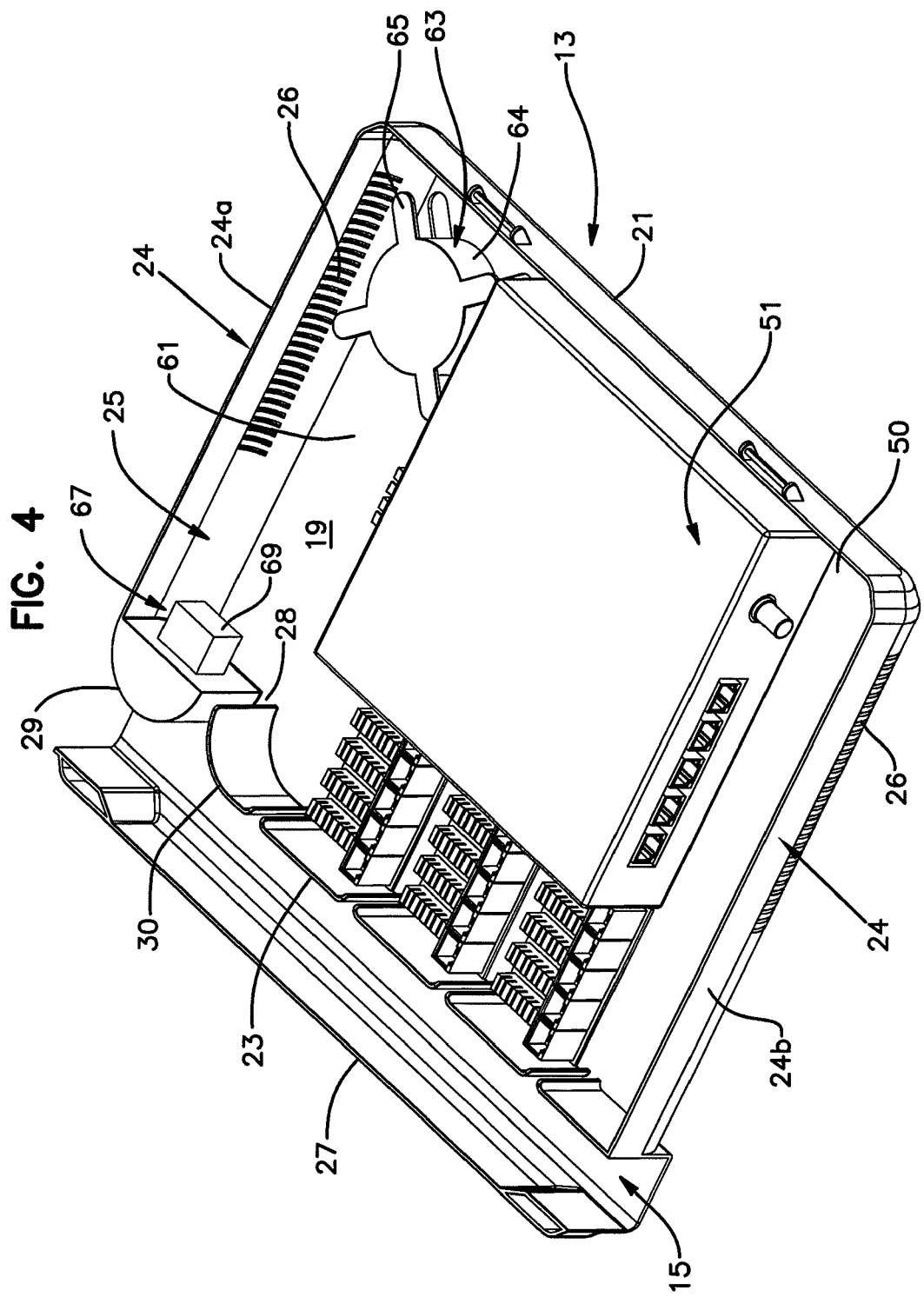
FIG. 4 is a perspective view of a housing of the multimedia enclosure of FIG. 3.
Figure 5:
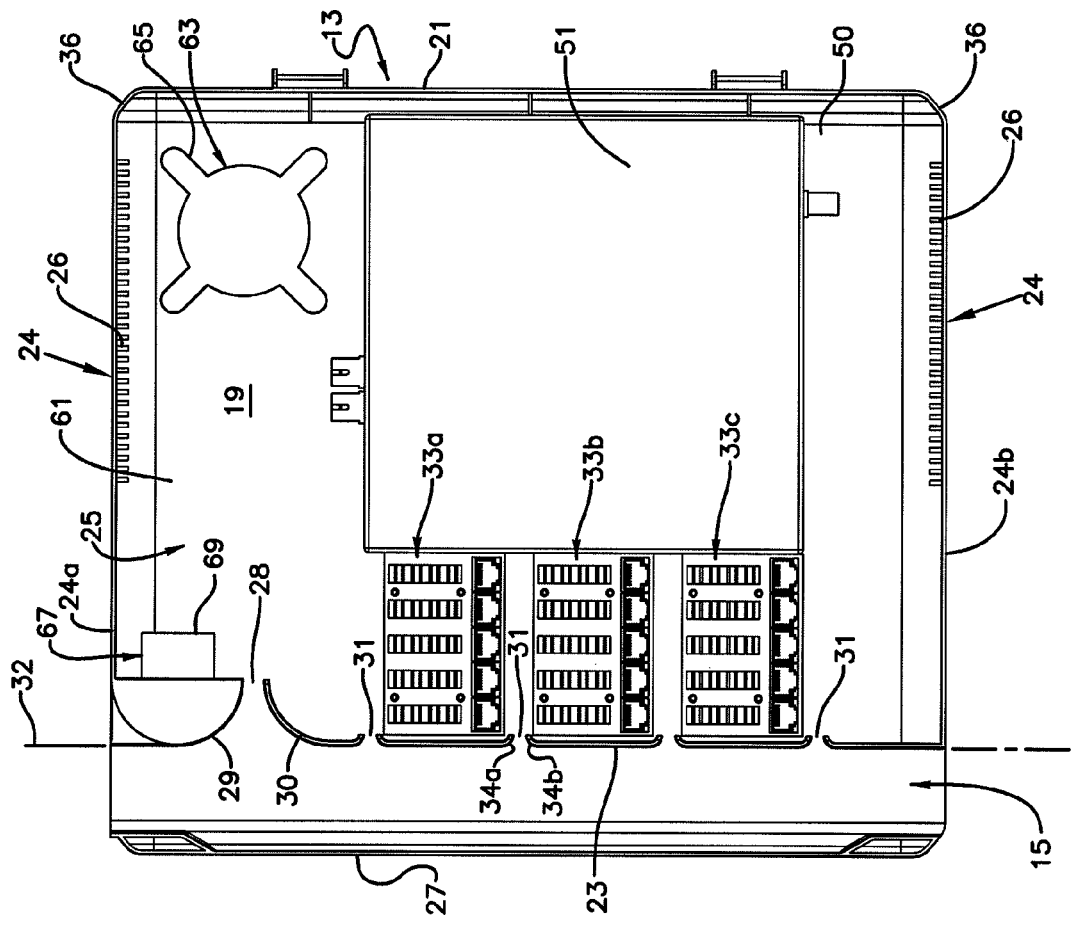
FIG. 5 is a front view of the housing of the multimedia enclosure of FIG. 3.

Referring now to FIGS. 4 and 5, the multimedia enclosure 11 is shown with the cover 17 removed. The housing 13 includes a base 19, a first sidewall 21 that extends outwardly from the base 19, and a second sidewall 23 oppositely disposed from the first sidewall 21 that also extends outwardly from the base 19. The housing 13 further includes two oppositely disposed connecting walls 24 that extend outwardly from the base 19. The connecting walls 24 connect corresponding sides of the first and second sidewalls 21, 23. With respect to FIGS. 4 and 5, one of the connecting walls 24 forms a top wall 24a of the multimedia enclosure 11 while the other connecting wall 24 forms a bottom wall 24b. The base 19 forms the back side of the multimedia enclosure 11. The base 19, the first and second sidewalls 21, 23, and the connecting walls 24 cooperatively define an interior region, generally designated 25, which will be described in greater detail subsequently. In the subject embodiment, each of the connecting walls 24 defines a vent passage 26 that allows for the passage of air through the interior region 25 of the housing 13.

The cable trough 15 is used to manage incoming fiber optic and copper cables and outgoing telephone, data and video cables as those cables enter and exit the housing 13 of the multimedia enclosure 11. In the subject embodiment, the cable trough 15 is disposed adjacent to the second sidewall 23. The cable trough is defined by the second sidewall 23 and a trough wall 27, which is oppositely disposed from the second sidewall 23, such that the cable trough 15 is disposed outside of the interior region 25 of the housing 13. Fiber optic cables enter the housing 13 from the cable trough 15 through a fiber passage 28. The fiber passage 28 is defined by first and second radius limiters 29, 30, respectively, disposed on the second sidewall 23. In the subject embodiment, the first radius limiter 29 is shaped as a half circle having a radius which is greater than the minimum bend radius of the fiber optic cables. The second radius limiter 30 is shaped as a quarter circle. In the subject embodiment, and by way of example only, the second radius limiter 30 has a radius that is about equal to the radius of the first radius limiter. While, the first and second radius limiters 29, 30 have been described herein as being half circle and quarter circle shaped, it will be understood that the scope of the present disclosure is not limited to such a configuration of the first and second radius limiters 29, 30.

Telephony and data cables enter and exit the housing 13 from the cable trough 15 through a plurality of passages 31 in the second sidewall 23. In the subject embodiment, the plurality of passages 31 divides the second sidewall 23 into a plurality of second sidewalls 23 that is generally aligned with a plane 32 (shown as a dashed line in FIG. 5). It will be understood, however, that the scope of the present disclosure is not limited to the plurality of passages 31 dividing the second sidewall 23 into a plurality of second sidewalls 23 or to the plurality of second sidewalls 23 being generally coplanar. In order to avoid damage caused by severe bending to the copper telephony and data cables as those cables enter and exit the interior region 25 of the housing through the plurality of passages 31, each of the plurality of passages 31 is defined by first and second bend limiters 34a, 34b (best shown in FIG. 13).

In addition to the first and second radius limiters 29, 30 and the first and second bend limiters 34a, 34b, the housing 13 includes corners 36, which are disposed between the first sidewall 21 and the top and bottom walls 24a, 24b, having a radius.

Disposed within the interior region 25 of the housing 13 is a plurality of termination blocks, generally designated 33. In a preferred embodiment, there are three termination blocks 33a, 33b, 33c, each of which is mounted to the base 19 of the housing 13. The first termination block 33a is a telephone input termination block 33a that is in connected engagement with an incoming telephone cable. The second termination block 33b is a telephone output termination block 33b that is in connected engagement with an outgoing telephone cable. The third termination block 33c is a data output termination block 33c that is in connected engagement with an incoming data cable and an outgoing data cable. In one embodiment, the termination blocks 33 are disposed along the second sidewall 23 of the housing 13 with the passages 31 disposed between each of the termination blocks 33.

Figure 6:
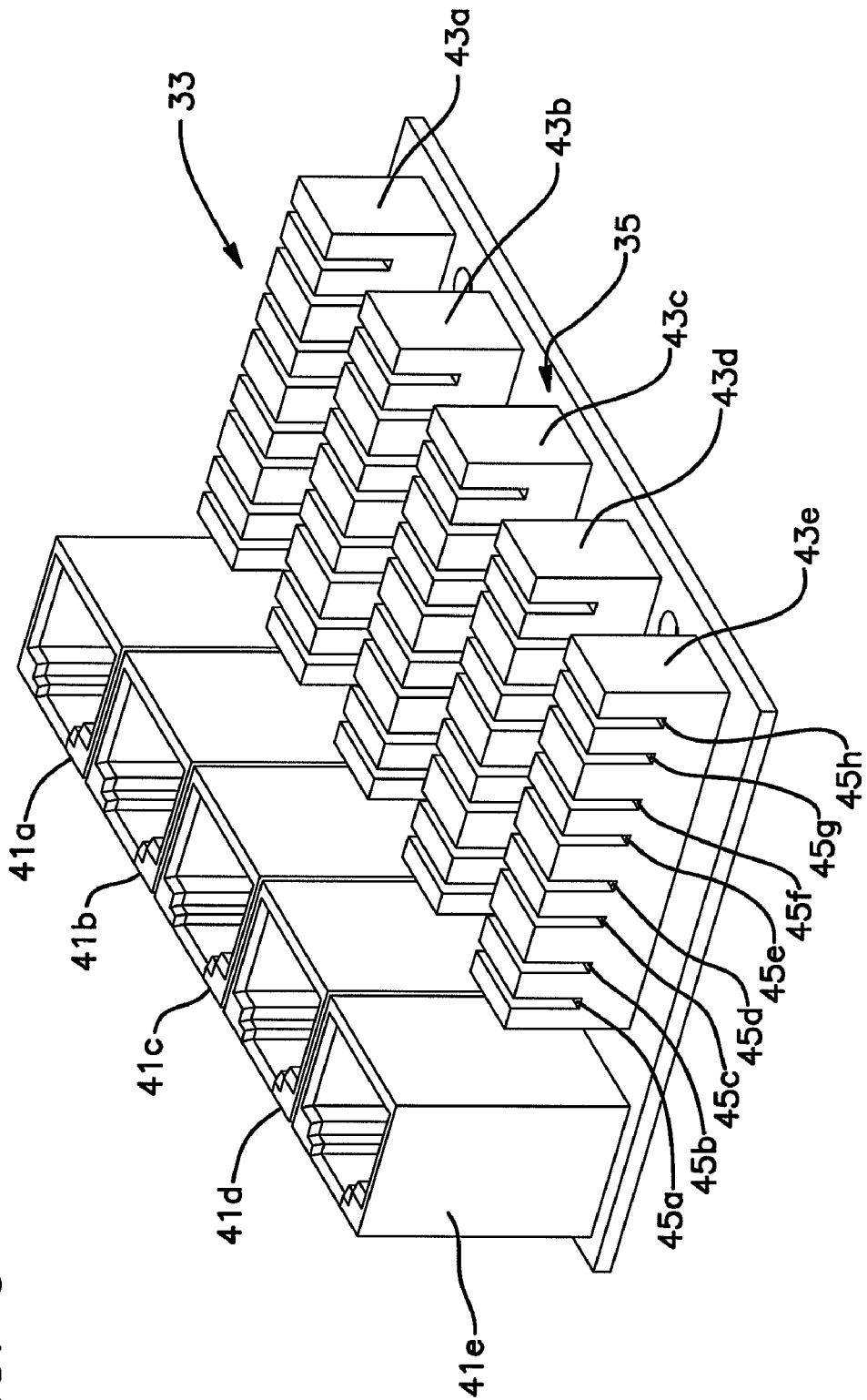
FIG. 6 is a perspective view of a termination block of the multimedia enclosure of FIG. 3.
Figure 7:
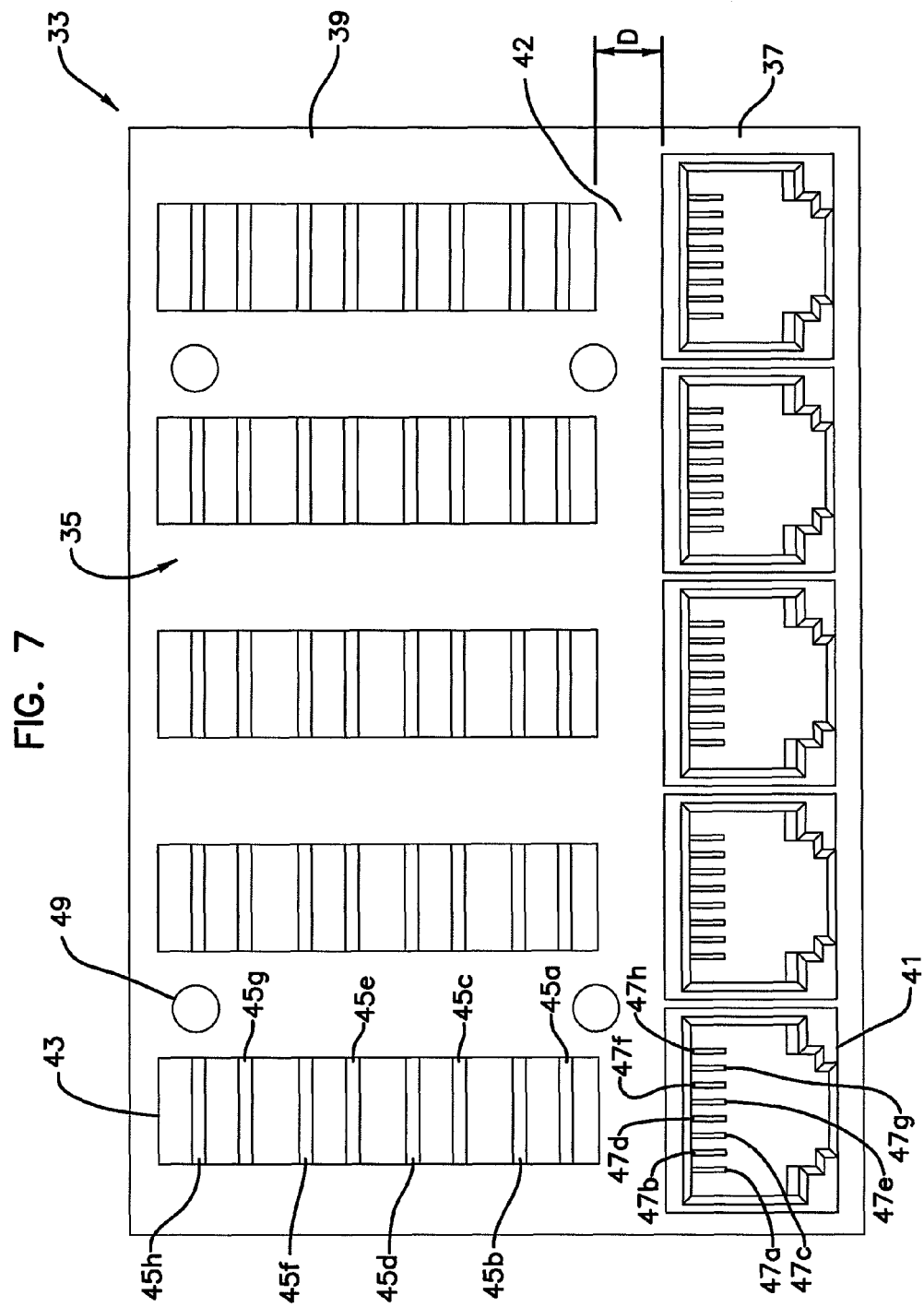
FIG. 7 is a front view of the termination block taken of FIG. 6.
Figure 8:
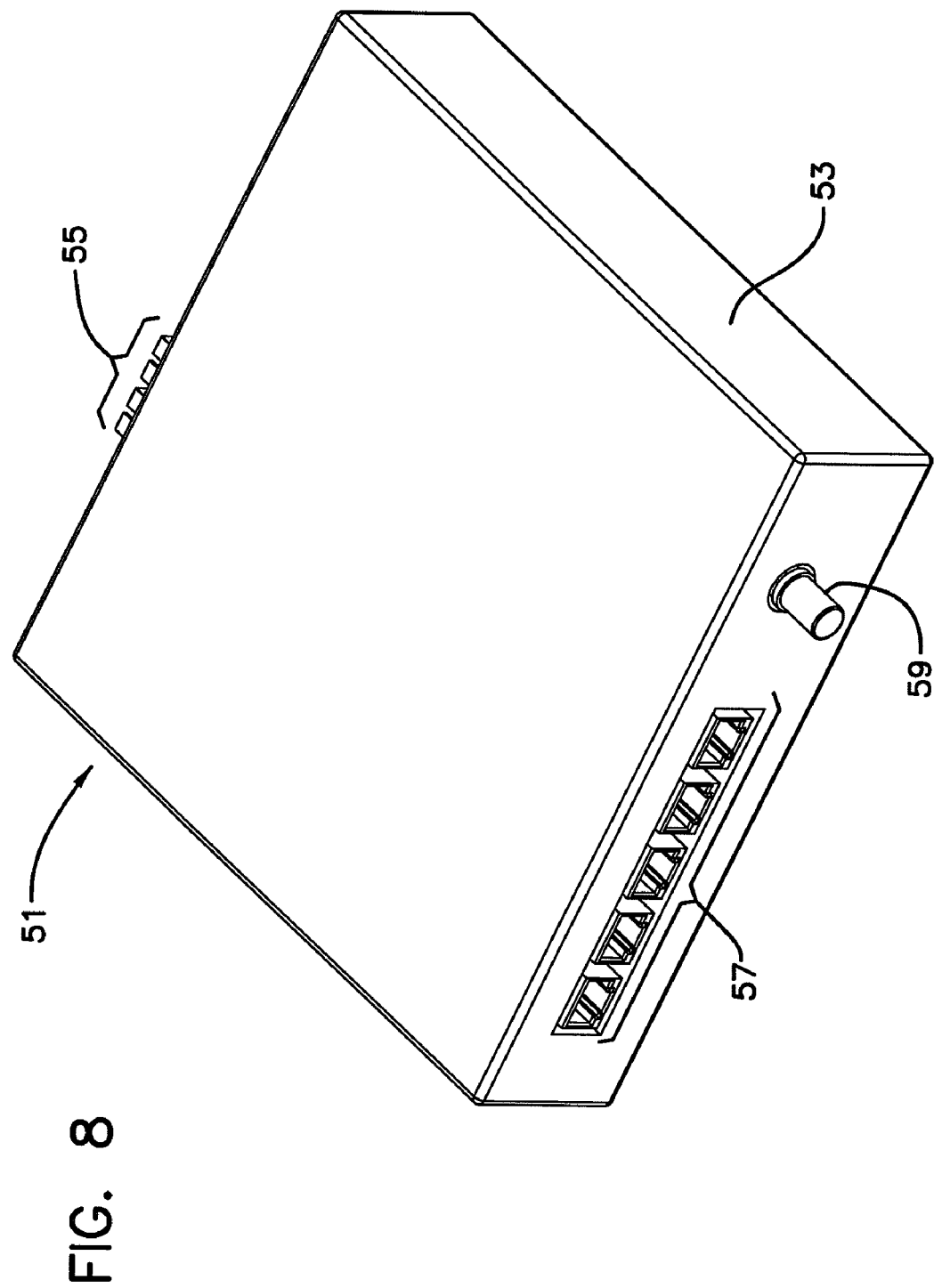
FIG. 8 is a perspective view of an optical network terminal of the multimedia enclosure of FIG. 3.
Figure 9:
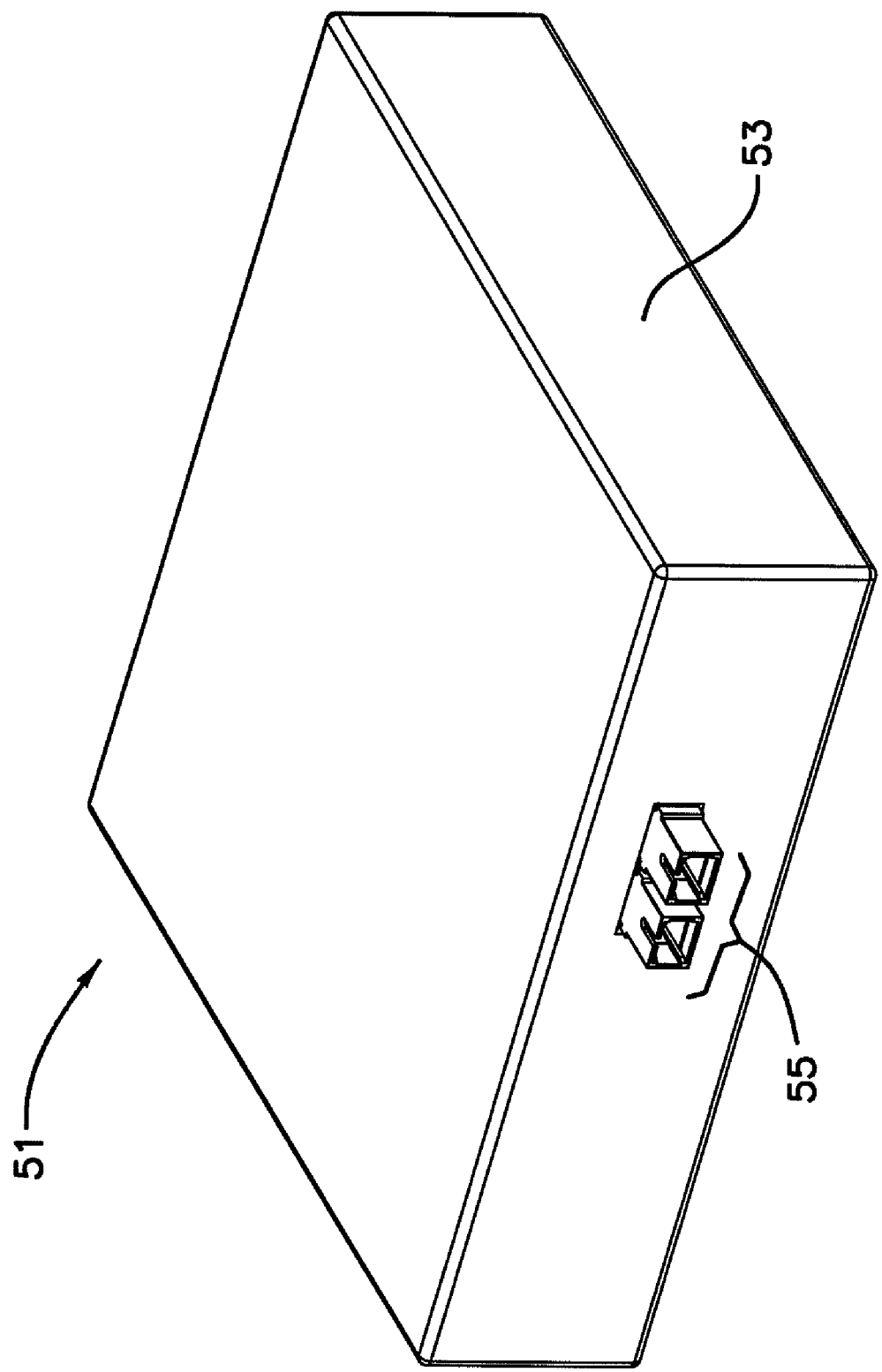
FIG. 9 is a perspective view of a back side of the optical network terminal of FIG. 8.

Referring now to FIGS. 6 and 7, the configuration of the termination blocks 33 will be described in greater detail. Each termination block 33 includes a printed circuit board, generally designated 35, having a first portion 37 and a second portion 39. A plurality of connector ports 41 is mounted along the first portion 37 of the printed circuit board 35 while a plurality of insulation displacement connectors (hereinafter referred to as "IDCs") 43 is mounted to the second portion 39 of the printed circuit board 35. In the subject embodiment, there are five connector ports 41a-e and five IDCs 43a-e mounted to the printed circuit board 35. The connector ports 41a-e are collinearly aligned along the first portion 37 of the printed circuit board 35 while the IDCs 43a-e are disposed on the second portion 39 of the printed circuit board 35 in a generally parallel configuration. In the subject embodiment, the IDCs 43 are mounted a distance D (shown in FIG. 7) from the connector ports 41, thereby forming a path 42 between the plurality of IDCs and the plurality of connector ports 41.

In the subject embodiment, the connector ports 41a-e are configured as RJ45 jacks, which are adapted to receive RJ45 plugs. However, as it may be advantageous for the connector ports 41a-e to be configured to receive other plugs, including but not limited to RJ11 plugs, it will be understood that the scope of the present disclosure is not limited to the connector ports 41a-e being configured to receive RJ45 plugs. In the subject embodiment, each IDC 43a-e includes eight terminal clips 45a-h while each connector port 41a-e includes eight pins 47a-h. Each of the IDCs 43a-e in the termination block 33 is in electrical communication with the corresponding connector port 41a-e through tracings of the printed circuit board 35 with each terminal clip 45a-h in each IDC 43a-e in electrical communication with one of the pins 47a-h of the connector ports 41a-e. In the subject embodiment, each terminal clip 45a-h in the IDC 43a-e is aligned with the respective terminal clip 45a-h in the adjacent IDC 43a-e. The termination block 33 further includes a plurality of mounting holes 49 disposed in the printed circuit board 35 for mounting the termination blocks 33 to the base 19 of the housing 13.

Referring now to FIGS. 4, 5, 8 and 9, the interior region 25 of the housing 13 includes an optical network terminal mounting area 50 for mounting a conventional optical network terminal (ONT), generally designated 51. While the subject embodiment will be described with regard to the optical network terminal 51, it will be understood that a conventional wireless router could be used in combination with the optical network terminal 51 and mounted in the interior region 25 of the housing 13. The optical network terminal 51 is a stand alone unit that provides telephony, data, and video outputs from a fiber optic cable input. The optical network terminal 51 includes a main housing 53 with fiber optic cable adapters 55, data/telephone outputs 57, and a video output 59. In the subject embodiment, there are two fiber optic cable adapters 55, five data/telephone outputs 57 with four of those data/telephone outputs 57 being for data and one being for telephone, and one video output 59. It will be understood, however, that the scope of the present disclosure is not limited to such a configuration of the optical network terminal 51. The optical network terminal 51 is mounted to the optical network terminal mounting area 50 using a plurality of fasteners. In the alternative, the optical network terminal 51 is mounted to a plate that engages the optical network terminal mounting area 50.

Referring again to FIGS. 4 and 5, the interior region 25 of the housing 13 defines a slack storage area 61, which is disposed adjacent to the optical network terminal 51 and the first termination block 33a. The slack storage area 61 provides a storage location for excess lengths of incoming fiber optic cable. Disposed within the slack storage area 61 is a cable management spool, generally designated 63, which is mounted to the base 19 of the housing 13. The cable management spool 63 includes an outer circumferential surface 64 that includes a radius that is greater than the minimum bend radius of the fiber optic cable. As the excess fiber optic cable is coiled around the outer circumferential surface 64 of the cable management spool 63, the outer circumferential surface 64 of the cable management spool 63 protects the fiber optic cable from damaged caused by bending during storage of the excess fiber optic cable. The cable management spool 63 further includes retention tabs 65 which act to retain the fiber optic cable on the cable management spool 63.

A storage bank, generally designated 67, is also disposed in the slack storage area 61 of the interior region 25 of the housing 13. In the subject embodiment, the storage bank 67 is mounted to the second sidewall 23 adjacent to one of the connecting walls 24. The storage bank 67 includes an adapter 69 adapted to receive a dust covered connectorized end of the fiber optic cable.

Figure 10:
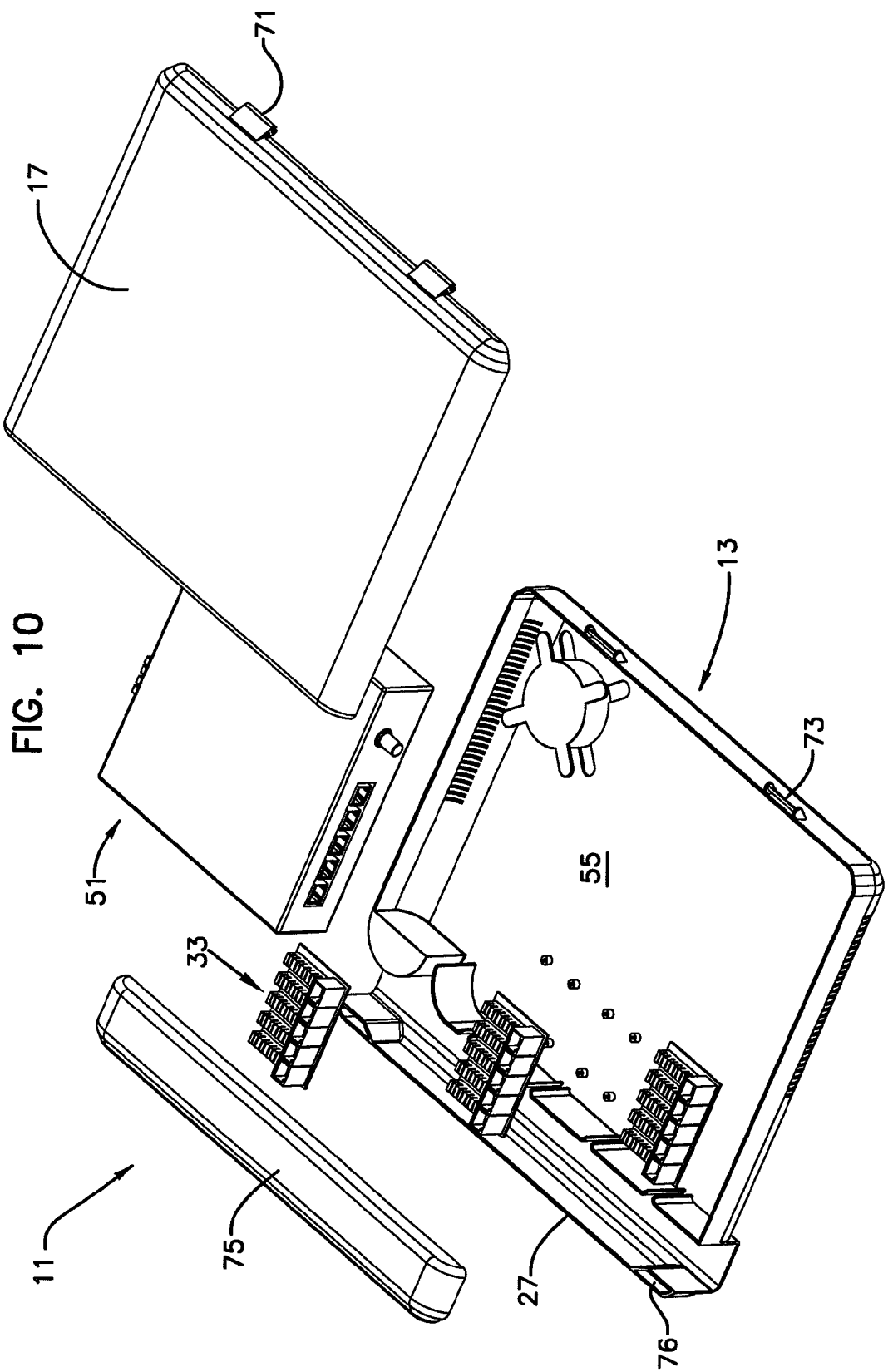
FIG. 10 is an exploded perspective view of the multimedia enclosure of FIG. 3.

Referring now to FIG. 10, the cover 17 is pivotally engaged with the housing 13. In the subject embodiment, the cover 17 includes a hinge 71 that is pivotally engaged with a mating hinge 73 disposed on the first sidewall 21 of the housing 13. The pivotal engagement of the cover 17 allows the cover 17 to be selectively opened and closed. In the closed position (as shown in FIG. 3), the cover 17 encloses the interior region 25 of the housing. In one embodiment, a trough cover 75 selectively encloses the cable trough 15. The trough cover 75 includes tabs that are engaged with recesses 76 that are disposed against the trough wall 27.

Figure 11:
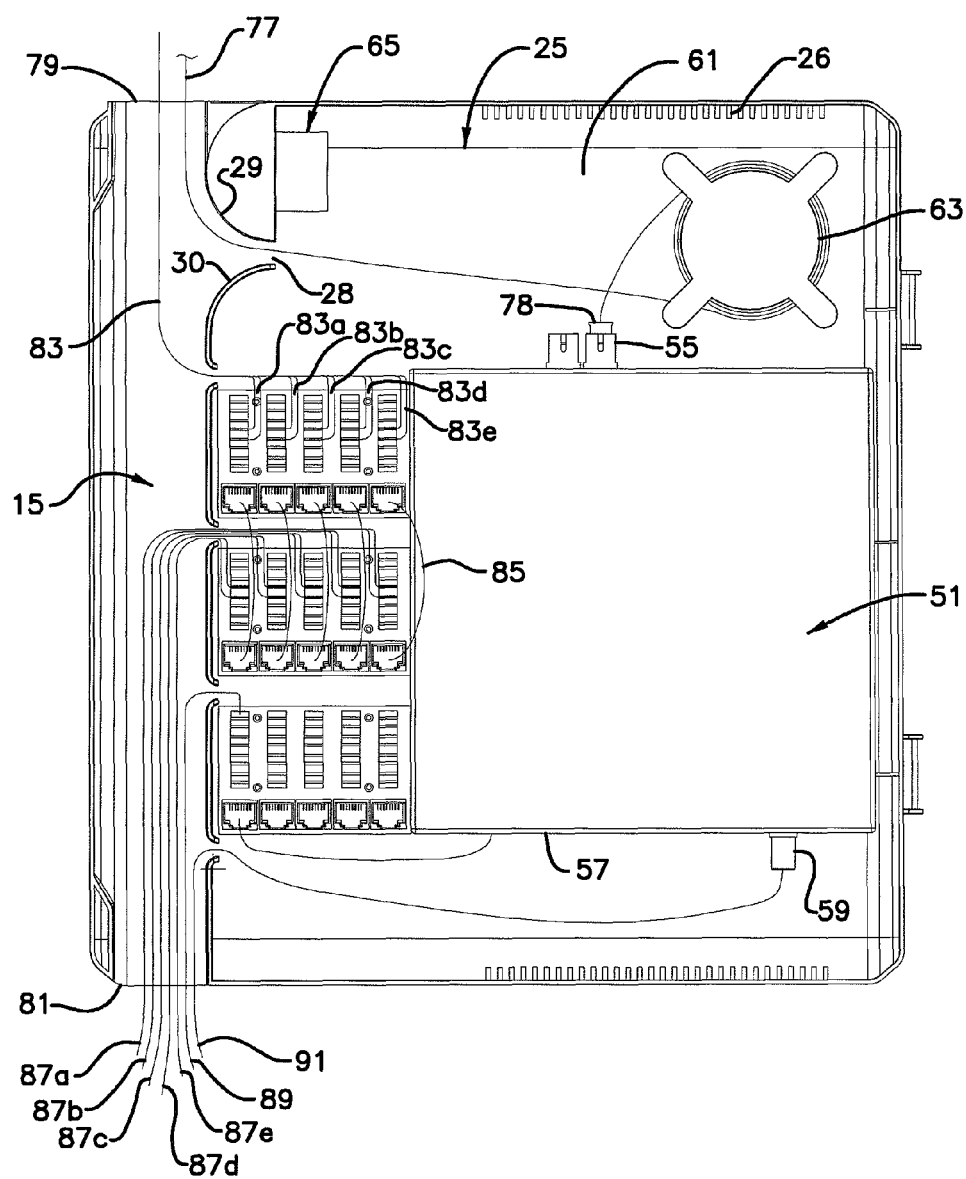
FIG. 11 is a front view of the housing of the multimedia enclosure of FIG. 3 showing an exemplary cable routing schematic.
Figure 12:
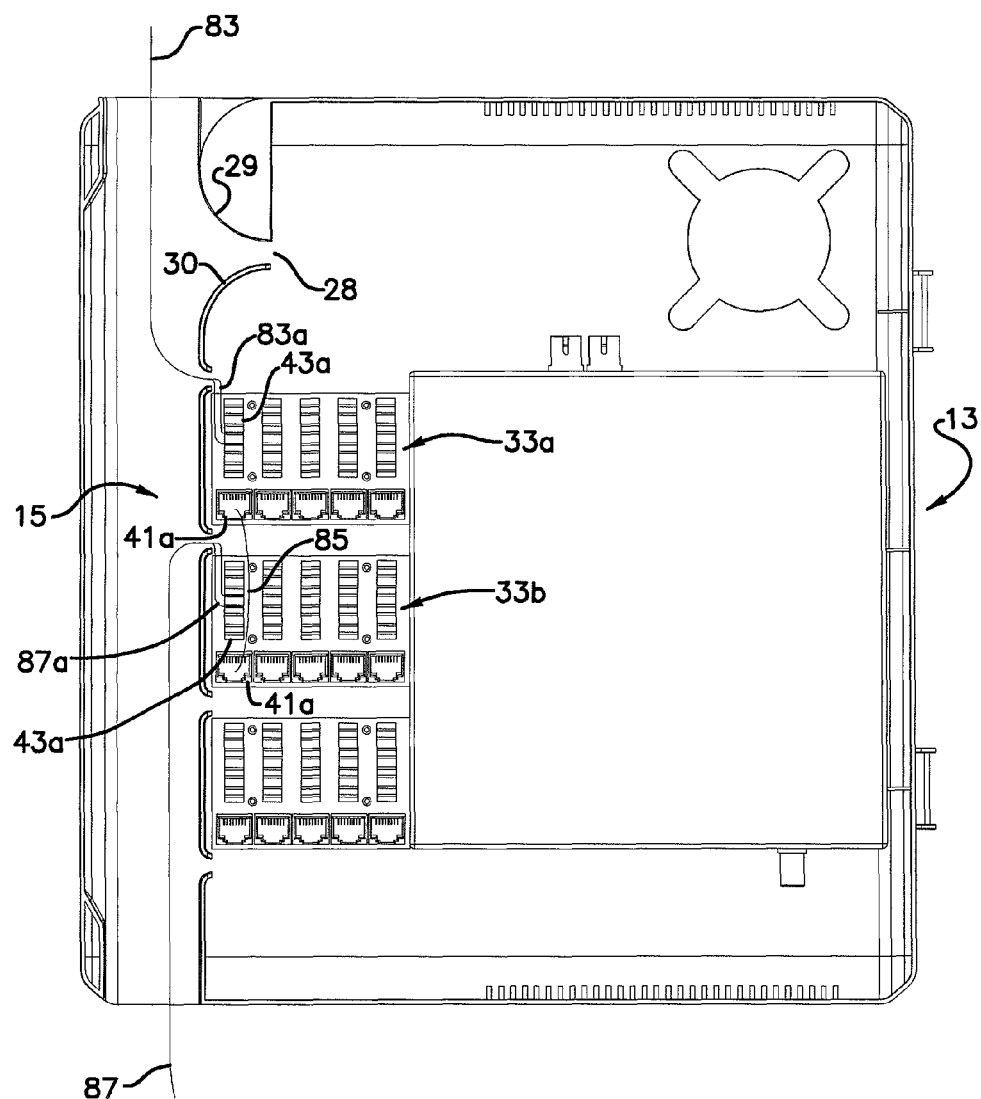
FIG. 12 is a front view of the housing of the multimedia enclosure of FIG. 3 showing an alternative exemplary cable routing schematic.

Referring now to FIGS. 11 and 12, the installation and use of the multimedia enclosure 11 will be described. The housing 13 is mounted to a wall (not shown) in a residence. The housing 13 may be mounted to the wall such that the base is fixedly mounted to the wall or such that the housing 13 is pivotally mounted to the wall. For example, the housing 13 may be mounted to the wall such that the housing 13 pivots about an edge of the housing 13 disposed between the trough wall 27 and the cable trough 15.

While the termination blocks 33 are mounted in the housing 13 at the time of installation, the wireless router and/or the optical network terminal 51 may or may not be installed in the housing 13 at this point. With the cover 17 in an open position and the trough cover 75 removed, a fiber optic cable 77 having a connectorized end 78 is inserted into the multimedia enclosure 11. The fiber optic cable 77 enters the multimedia enclosure 11 through a first end 79 of the cable trough 15. The fiber optic cable bends around the first radius limiter 29 through the fiber passage 28 and into the interior region 25 of the housing 13. In the alternative, the fiber optic cable 77 could enter the multimedia enclosure 11 through a second end 81 of the cable trough 15. If the fiber optic cable 77 enters the cable trough 15 through the second end 81, the fiber optic cable 77 would bend around the second radius limiter 30 and enter into the interior region 25 of the housing 13 through the fiber passage 28. As previously stated, the first and second radius limiters 29, 30 have radii which are greater than the minimum bend radius of the fiber optic cable 77. Therefore, as the fiber optic cable 77 enters the interior region 25 of the housing 13, the fiber optic cable 77 is protected from any attenuation caused by severe bending of the fiber optic cable 77.

Excess fiber optic cable 77 is wrapped around the cable management spool 63 in the slack storage area 61. When the fiber optic cable 77 is not in use, the connectorized end 78 of that fiber optic cable 77 can be placed in the adapters 69 in the storage bank 67. If the optical network terminal 51 has been installed and the fiber optic cable 77 is ready for use, the connectorized end 78 of the fiber optic cable can be inserted into the fiber optic cable adapters 55 on the optical network terminal 51.

An incoming telephone cable 83 from a telecommunications network enters the multimedia enclosure 11 through the cable trough 15 and into the interior region 25 of the housing 13 through the passage 31. In the case of a star configured telecommunication network, and by way of example only, the incoming telephone cable 83 includes five pairs of wires 83a-e. Each of the five pairs of wires 83a-e is inserted into the terminal clips 45 of the IDCs 43a-e in the first termination block 33a, with each IDC 43a-e receiving one of the pairs of wires 83a-e. The terminal clip 45a-h into which each wire in the pair of wires 83a-e is inserted is selected based on the wiring requirements of the connector port 41. For example, a telephone typically requires the forth and fifth pins 47d, 47e to be active. In this scenario, if the pair of wires 83a was to be connected to IDC 43a, one wire in the pair of wires 83a would be inserted into the terminal clip 45d of IDC 43a corresponding to the forth pin 47d while the other wire would be inserted into the terminal clip 45e corresponding to the fifth pin 47e.

With the incoming telephone cable 83 connected to the first termination block 33a in the housing 13 of the multimedia enclosure 11, connectorized ends of patch cables 85 are selectively inserted into the connector ports 41 of the first and second termination blocks 33a, 33b. As previously stated, in the subject embodiment, the connectorized ends of the patch cables 85 are RJ45 plugs which are adapted to be received in the RJ45 jacks of the connector ports 41. One of the connectorized ends of the patch cable 85 is inserted into the connector port 41 in the first termination block 33a while the other connectorized end of the patch cable 85 is inserted into the connector port 41 in the second termination block 33b. As the patch cables 85 do not have to span a great distance in the multimedia enclosure 11, the patch cables 85 are typically short cables.

In the subject embodiment, five outgoing telephone cables 87a-e each include a pair of wires with each pair of wires exiting the multimedia enclosure 11 en route to an end location such as a room. Each pair of wires of the outgoing telephone cables 87a-e is inserted into the terminal clips 45 of the IDCs 43a-e in the second terminal block 33a, with each IDC 43a-e receiving one pair of wires of the outgoing telephone cables 87a-e. As the connector port 41 in the second termination block 33b is in communication with the connector port 41 in the first termination block 33a through the patch cable 85, the terminal clip 45a-h into which each wire in each pair of wires 87a-e is inserted in the second termination block 33b is selected based on which pins 47a-h are active in the corresponding connector port 41 in the first termination block 33a. As in the previous example, if the forth and fifth pins 47d, 47e in the connector port 41a in the first termination block 33a are active and the patch cable 85 is in connected engagement with the connector port 41a in the first termination block 33a and the connector port 41a in the second termination block 33b, one wire in the pair of wires 87a would be engaged with the terminal clip 45d while the other wire in the pair would be engaged with the terminal clip 45e. In this manner, the incoming telephone cable 83 is connectedly engaged with the outgoing telephone cable 87.

In the subject embodiment, if all five pairs of incoming telephone cable 83a-e are active with each connected to a different IDC 43a-e of the first termination block 33a and patch cables 85 connecting the connector ports 41a-e of the first termination block 33a to the connector ports 41a-e in the second termination block 33b, five distinct telephone lines would be available at five locations in the residence.

Patch cables 85 also selectively connect the connector ports 41 in the third termination block 33c to the data/telephone outputs 57 in the optical network terminal 51. In the subject embodiment, five outgoing data cables 89a-e are in connected engagement with the IDCs 43a-e in the third termination block 33c. The outgoing data cables exit the cable trough 15 en route to the end location. The end location typically includes a terminal with two ports, a telephone port and a data port. The telephone port is in communication with one of the outgoing telephone cables 87a-e while the data port is in communication with one of the outgoing data cables 89a-e. In the event that two telephone ports are needed in the end location, the data port can be converted into a telephone port by connecting the connector port 41 in the third termination block 33c that is in communication with the corresponding outgoing data cable 89 to the connector port 41 in the first termination block 33a corresponding to the different incoming telephone cable 83 with the patch cable 85.

An outgoing video cable 91 may also be connected to the video output 59 of the optical network terminal 51. The outgoing video cable 91 passes from the interior region 25 into the cable trough 15 through the passage 31 and exits the multimedia enclosure 11 en route to an end location in the residence.

Referring now to FIG. 12, a daisy chain configured telecommunications network will be described. In the case of a daisy chain configured telecommunication network, and by way of example only, the incoming telephone cable 83 consists of the single pair of wires 83a. Each wire in that pair of wires 83a is inserted into the terminal clips 45 in one of the IDCs 43a-e in the first termination block 33a. Similar to the star configuration, the terminal clip 45a-h into which each wire in the pair of wires 83a is inserted is selected based on the wiring requirements of the connector port 41.

With the incoming telephone cable 83 connected to the first termination block 33a in the housing 13 of the multimedia enclosure 11, connectorized ends of the patch cable 85 are selectively inserted into the connector ports 41 of the first and second termination blocks 33a, 33b. One of the connectorized ends of the patch cable 85 is inserted into the connector port 41a in the first termination block 33a while the other connectorized end of the patch cable 85 is inserted into the connector port 41a in the second termination block 33b.

The outgoing telephone cable 87 consists of the single pair of wires 87a, which are in connected engagement with the terminal clips 45 of the IDC 43a in the second termination block 33b. In this manner, the incoming telephone cable 83 is connectedly engaged with the outgoing telephone cable 87, which exits the cable trough 15 en route to the first location in the daisy chain series.

Figure 13:
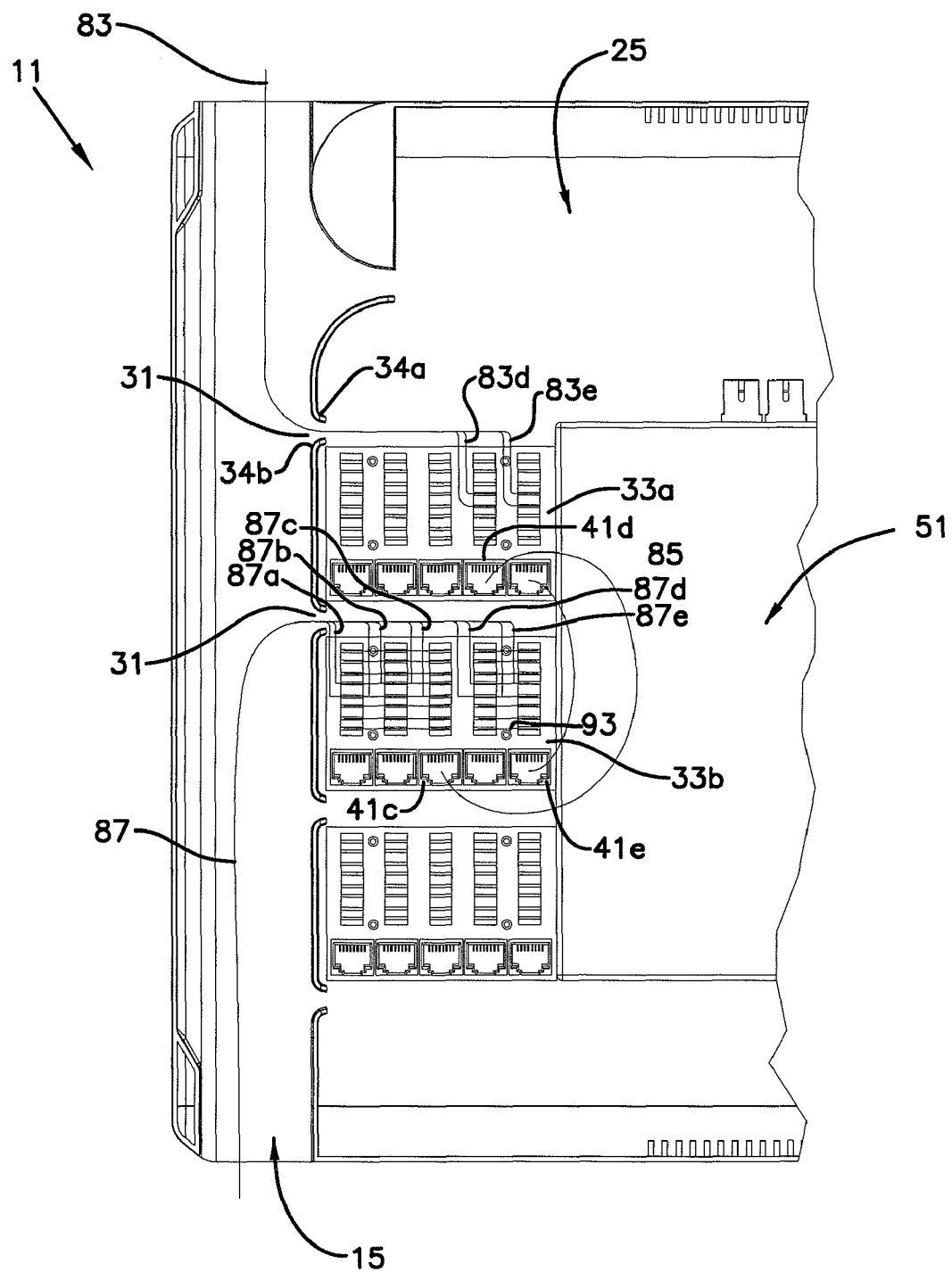
FIG. 13 is an enlarged fragmentary view of the housing of the multimedia enclosure of FIG. 3 showing an alternative exemplary cable routing schematic.

Referring now to FIG. 13, an alternate cable routing scheme for the star configuration will be described. In the subject embodiment, and by way of example only, only two pairs of wires 83d,e of an incoming telephone cable 83 into a residence are active (the other pairs of wires 83a-c are not shown in order to make the figure clearer). Therefore, this particular residence can have up to two different telephone lines with each line having a unique telephone number. However, in the present example, there are five locations in the residence that require telephone access with two of those five locations requiring access to one of the telephone lines and the other three of those five locations requiring access to the other telephone line. In this case, one pair of wires for the incoming telephone cable 83d are connected to terminal clips 45d,e in the IDC 43d while the other pair of wires 83e are connected to terminal clips 45d,e in the IDC 43e. The connector port 41e of the first termination block 33a, which is in communication with the IDC 43e, is connected via patch cable 85 to the connector port 41e of the second termination block 33b, which is in communication with IDC 43e.

In the subject embodiment, jumper cables 93 connect the terminal clips 45a-h of the IDC 43e of the second termination block 33b with the corresponding terminal clips 45a-h of the IDC 43d of the second termination block 33b. Therefore, the outgoing telephone cables 87d,e are in communication with the pair of wires 83e in the incoming telephone cable 83.

The connector port 41d of the first termination block, which is in communication with the IDC 43d, is connected via patch cable 85 to the connector port 41c of the second termination block 33b. Jumper cables 93 connect the terminal clips 45a-h of the IDC 43c of the second termination block 33b with the corresponding terminal clips 45a-h of the IDC 43b and the IDC 43a of the second termination block 33b. Therefore, the outgoing telephone cables 87a-c are in communication with the pair of wires 83d in the incoming telephone cable 83. With this cable routing configuration, two end locations, which are in communication with the second termination block 33b through the outgoing telephone cables 87d,e, are in communication with the pair of wires 83e in the incoming telephone cable 83 while three end locations, which are in communication with the second termination block 33b through the outgoing telephone cables 87a-c, are in communication with the pair of wires 83d in the incoming telephone cable 83. It will be understood that the scope of the present disclosure is not limited to such a cable routing configurations since various configurations are possible.

Figure 14:
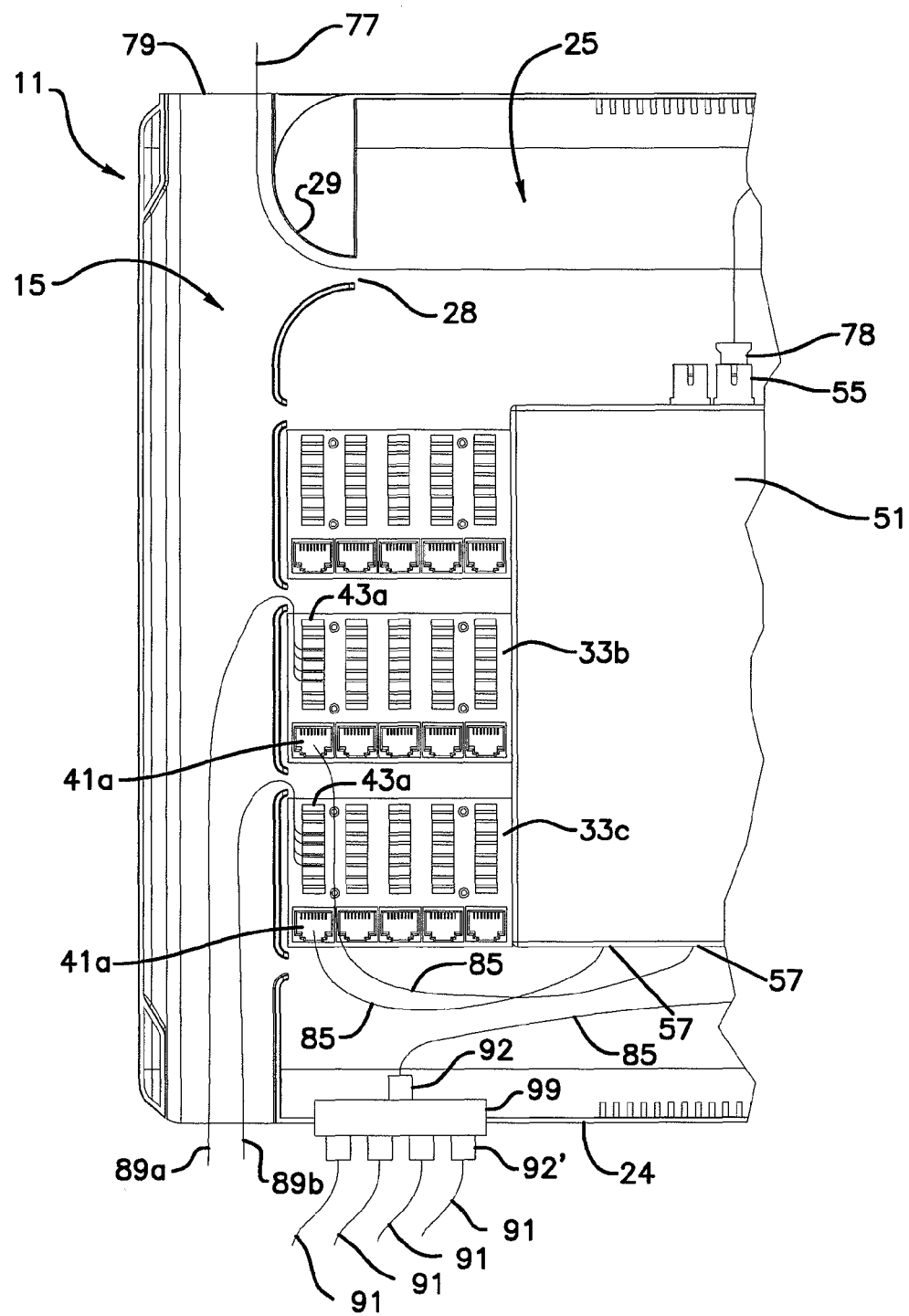
FIG. 14 is an enlarged fragmentary view of the housing of the multimedia enclosure of FIG. 3 showing an alternative exemplary cable routing schematic.

Referring now to FIG. 14, an alternate cable routing scheme for providing an end location with two data ports will be described. The fiber optic cable 77 enters the multimedia enclosure 11 through a first end 79 of the cable trough 15. The fiber optic cable 77 bends around the first radius limiter 29 through the fiber passage 28 and into the interior region 25 of the housing 13. The connectorized end 78 of the fiber optic cable 77 is inserted into the fiber optic cable adapters 55 on the optical network terminal 51.

One of the connectorized ends of a first patch cable 85 is inserted into the connector port 41a in the second termination block 33b while the other connectorized end of the patch cable 85 is inserted into one of the data/telephone outputs 57 on the optical network terminal 51. One of the connectorized ends of a second patch cable 85 is inserted into the connector port 41a in the third termination block 33c while the other connectorized end of the patch cable 85 is inserted into another data/telephone output 57 on the optical network terminal 51. In the subject embodiment, a first outgoing data cable 89a is in connected engagement with the IDC 43a in the second termination block 33b while a second outgoing data cable 89b is in connected engagement with the IDC 43a in the third termination block 33c. The outgoing data cables 89a, 89b exit the cable trough 15 en route to data ports at the end location.

Figure 15:
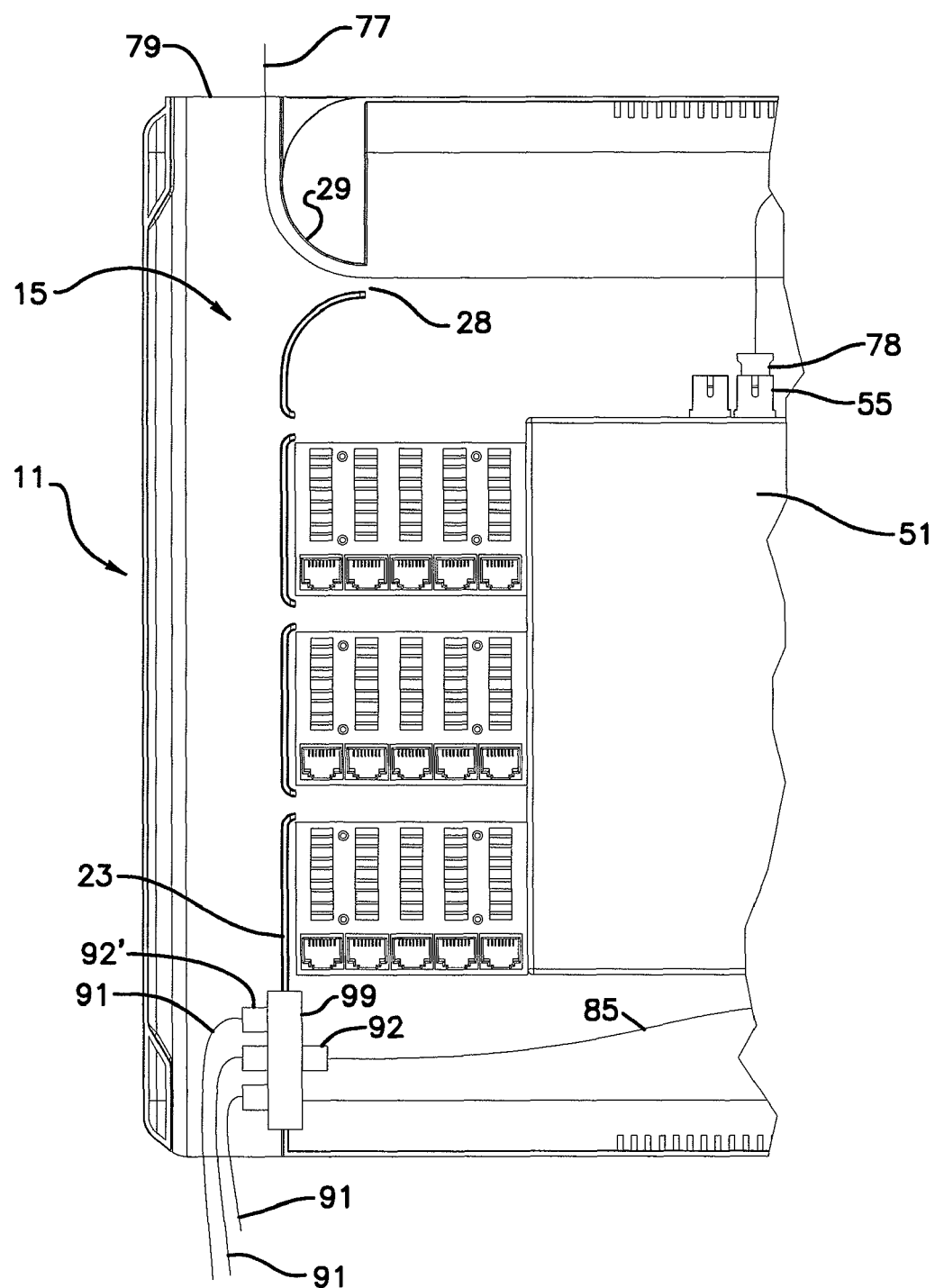
FIG. 15 is an enlarged fragmentary view of the housing of the multimedia enclosure of FIG. 3 showing an alternative exemplary cable routing schematic.

Referring now to FIGS. 14 and 15, a patch cable 85 is in connected engagement with the video output 59 on the optical network terminal 51 and a video port 92 on a splitter 99. In FIG. 14, the splitter 99 is disposed in one of the connecting walls 24 while in FIG. 15 the splitter 99 is disposed in the second sidewall 23. Outgoing video cables 91, which are in connected engagement with a plurality of video ports 92' on the splitter 99, exit the multimedia enclosure 11 en route to the end location.

Figure 16:
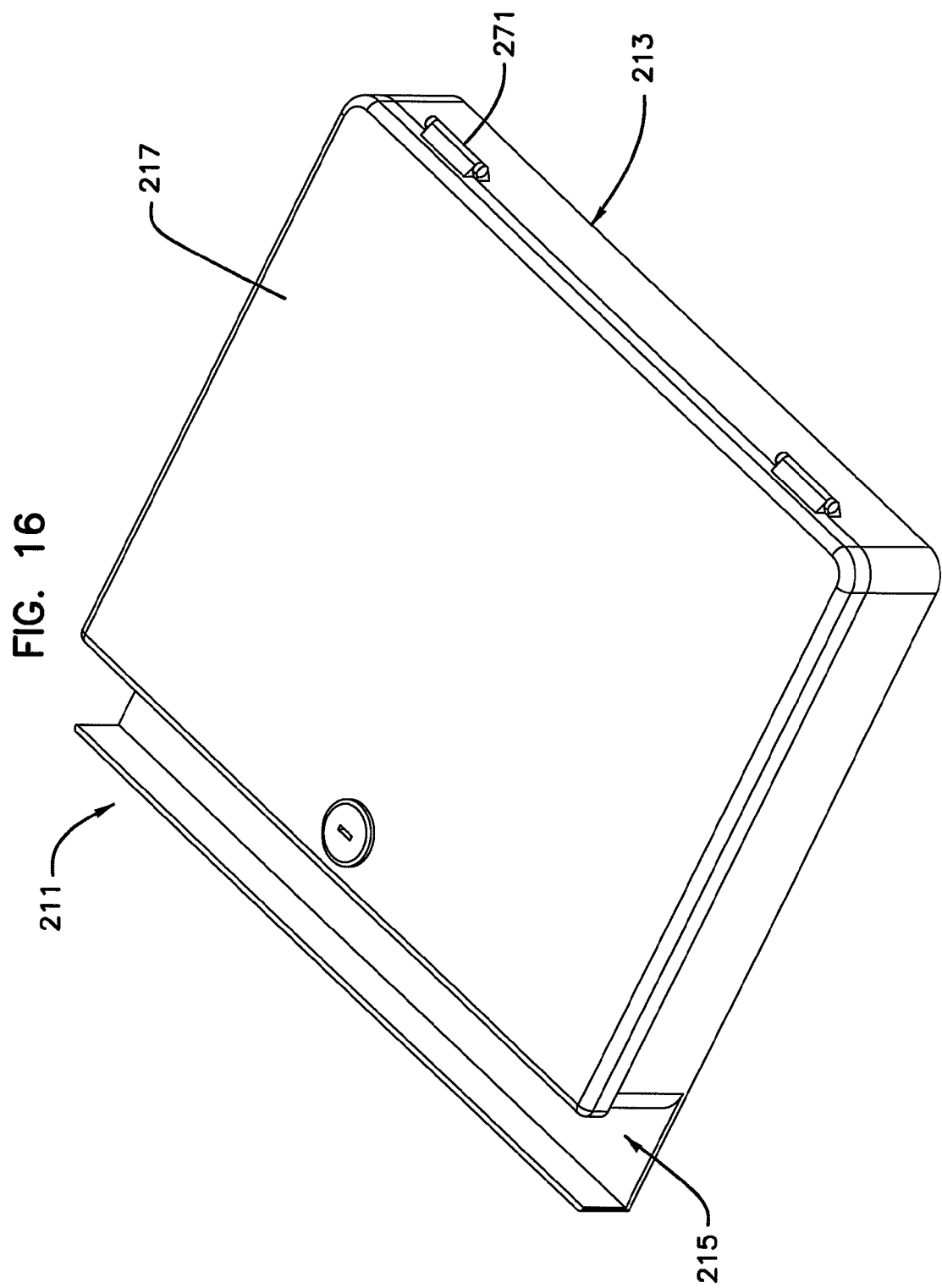
FIG. 16 is an alternate embodiment of a multimedia enclosure having features that are examples of aspects in accordance with the principles of the present disclosure.

Referring now to FIG. 16, an alternative multimedia enclosure 211 will be described. The alternative multimedia enclosure 211 includes a housing, generally designated 213, a cable trough, generally designated 215, and a cover 217.

Figure 17:
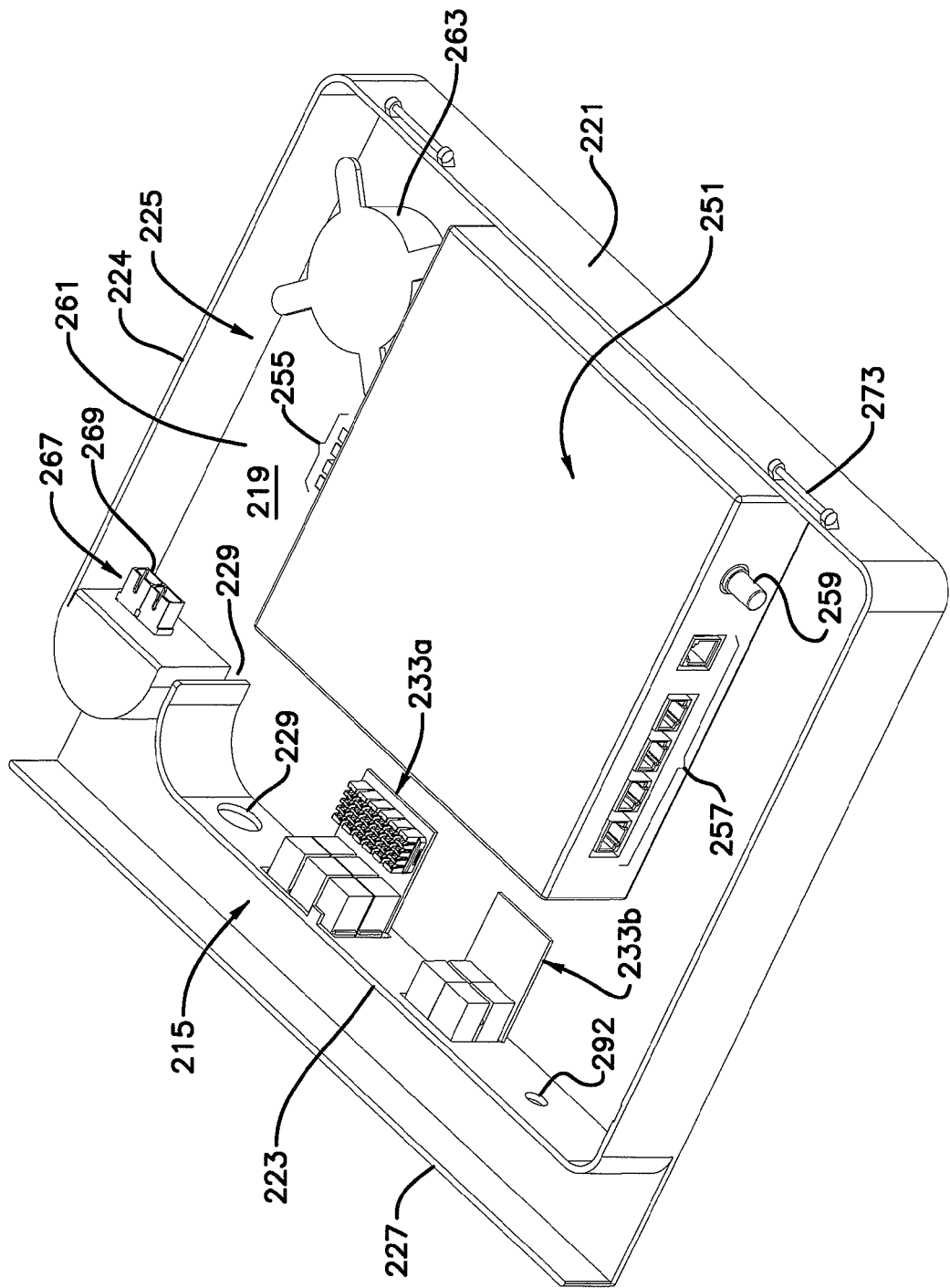
FIG. 17 is a perspective view of a housing of the multimedia enclosure of FIG. 16.

Referring now to FIG. 17, the alternative multimedia enclosure 211 is shown with the cover 217 removed. The housing 213 includes a base 219, a first sidewall 221 that extends outwardly from the base 219, and a second sidewall 223 oppositely disposed from the first sidewall 221 that also extends outwardly from the base 219. The housing 213 further includes two oppositely disposed connecting walls 224 that extend outwardly from the base 219 and connect corresponding sides of the first and second sidewalls 221, 223. The base 219, the first and second sidewalls 221, 223, and the connecting walls 224 cooperatively define an interior region, generally designated 225, which will be described in greater detail subsequently.

The cable trough 215 is disposed adjacent to the second sidewall 223. The cable trough 215 is defined by the second sidewall 223 and a trough wall 227, which is oppositely disposed from the second sidewall 223, such that the cable trough 215 is disposed outside of the interior region 225 of the housing 213. Cables enter the housing 213 from the cable trough 215 through passages 231 in the second sidewall 223.

Disposed within the interior region 225 of the housing 213 is a plurality of termination blocks, generally designated 233. In a preferred embodiment, there are two termination blocks 233, each of which is mounted to the base 219 of the housing 213. The first termination block 233a is a telephone termination block 233a that is in connected engagement with an incoming telephone cable and an outgoing telephone cable. The second termination block 233b is a data output termination block 233b that is in connected engagement with an incoming data cable and outgoing data cable. In a preferred embodiment, the termination blocks 233 are disposed along the second sidewall 223 of the housing 213.

Referring now to FIGS. 18 and 19, the configuration of the first termination block 233a will be described in greater detail. The first termination block 233a includes a printed circuit board, generally designated 235a, having a first portion 237a and a second portion 239a. A plurality of connector ports 241 are mounted along the first portion 237a of the printed circuit board 235a. In the first termination block 233a (shown in FIGS. 16 and 17), a plurality of insulation displacement connectors (hereinafter referred to as "IDCs") 243 are mounted to the second portion 239a of the printed circuit board 235a. In the subject embodiment, there are six connector ports 241a-f and six IDCs 243a-f mounted to the printed circuit board 235a. The connector ports 241a-f are in a stacked configuration along the first portion 237a of the printed circuit board 235a while the IDCs 243a-f disposed on the second portion 239a of the printed circuit board 235a in a generally parallel configuration. As connector ports 241 and IDCs 243 are well known to those skilled in the art, a detailed description of the connector ports 241 and IDCs 243 will not be provided herein. In the subject embodiment, the connector ports 241a-f are configured to receive RJ11 connectors. However, as it may be advantageous for the connector ports 241a-f to be configured to receive other connectors, it will be understood that the scope of the present disclosure is not limited to the connector ports 241a-f being configured to receive RJ11 connectors. In the subject embodiment, each IDC 243a-f includes four terminal clips 245a-d while each connector port 241a-f includes four pins (not shown). Each of the IDCs 243a-f in the first termination block 233a is in electrical communication with the corresponding connector ports 241a-e through the printed circuit board 235a with each terminal clip 245a-d in each IDC 243a-f in electrical communication with one of the pins of the connector ports 241a-f. In the subject embodiment, the location of each terminal clip 245a-d in the IDC 243a-f is aligned with the location of the respective terminal clip 245a-d in the adjacent IDC 243a-f.

Figure 20:
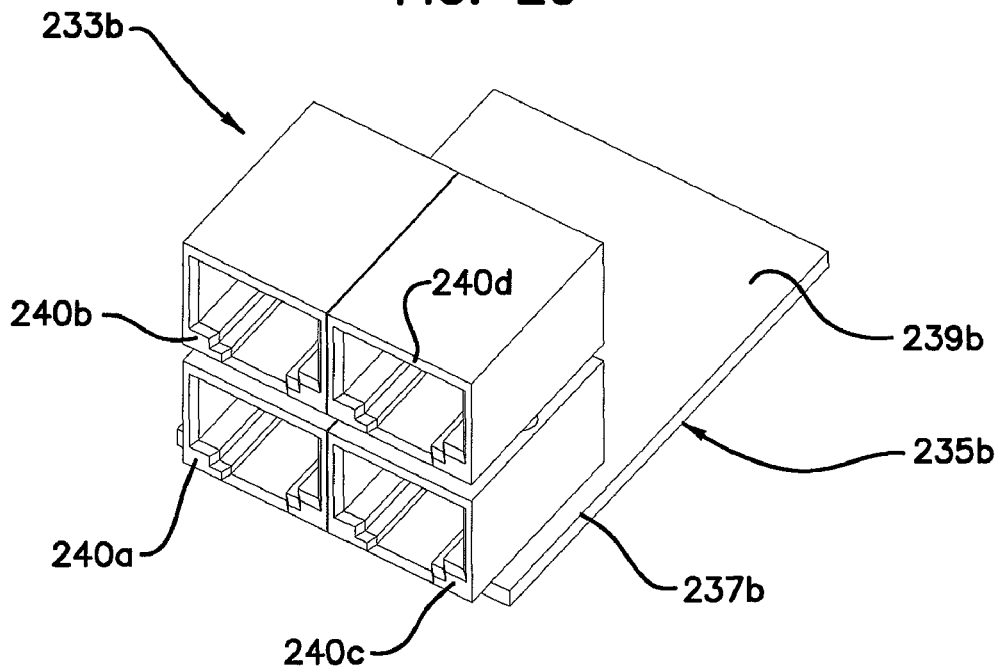
FIG. 20 is a perspective view of a second termination block of the multimedia enclosure of FIG. 16.
Figure 21:
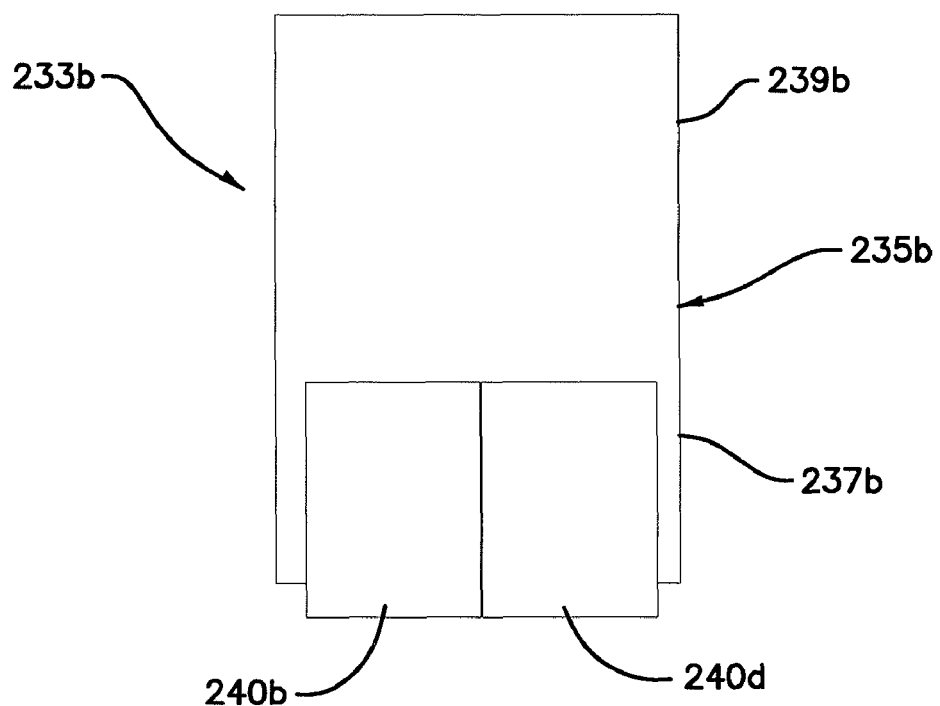
FIG. 21 is a front view of the second termination block of FIG. 20.

Referring now to FIGS. 20 and 21, the second termination block 233b will be described. The second termination block 233b includes a printed circuit board, generally designated 235b, having a first portion 237b and a second portion 239b. In the subject embodiment, four data connector ports 240a-d are mounted along the first portion 237b of the printed circuit board 235b. Solder pad mounts are disposed on the second portion 239b of the printed circuit board 235b, with each solder pad mount corresponding to one pin in the data connector ports 240a-d.

The connector ports 241a-f and the data connector ports 240a-d are positioned against the second sidewall 223 of the housing 213 such that the connector ports 241a-f and the data connector ports 240a-d are accessible from the cable trough 215.

Referring again to FIG. 17, at least one of a conventional optical network terminal, generally designated 251, is mounted in the interior region 225 of the housing 213 through a plurality of mounts (not shown). The optical network terminal 251 includes fiber optic cable adapters 255, data/telephone outputs 257, and a video output 259.

The interior region 225 of the housing 213 defines a slack storage area 261, which is disposed adjacent to the optical network terminal 251. The slack storage area 261 provides a storage location for excess lengths of incoming fiber optic cable. Disposed within the slack storage area 261 is a cable management spool 263, which is mounted to the base 219 of the housing 213. A storage bank, generally designated 267, is also disposed in the slack storage area 261 of the interior region 225 of the housing 213 and mounted to the second sidewall 223 in the subject embodiment. The storage bank 267 includes an adapter 269 that is adapted to receive a dust covered connectorized end of the fiber optic cable.

Referring again to FIG. 16, the cover 217 is pivotally engaged with the housing 213. In the subject embodiment, the cover 217 includes a hinge 271 that is pivotally engaged with a mating hinge 273 (shown in FIG. 17) disposed on the first sidewall 221 of the housing. The pivotal engagement of the cover 217 allows the cover 217 to be selectively opened and closed. In the closed position (as shown in FIG. 16), the cover 217 encloses the interior region 225 of the housing 213.

Figure 22:
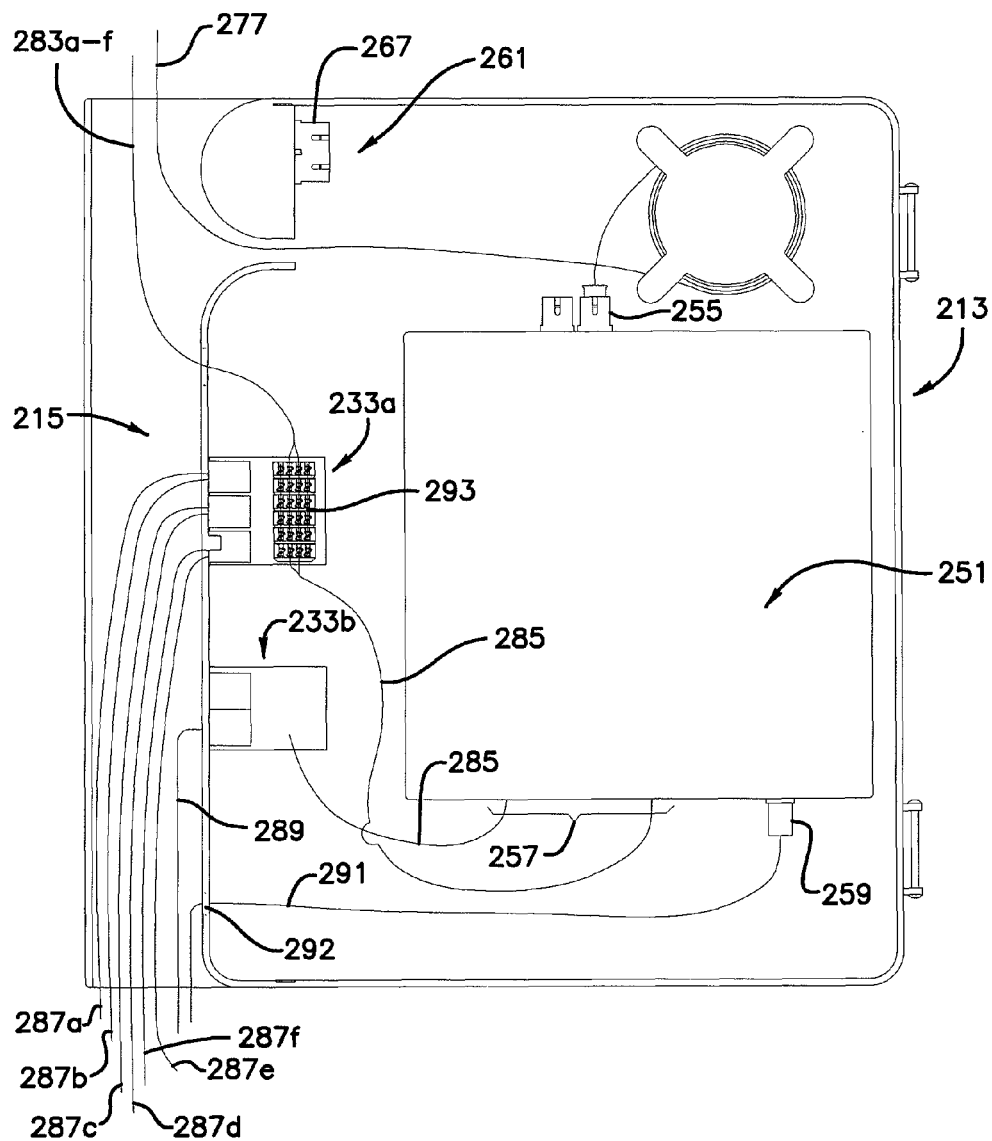
FIG. 22 is a front view of the housing of the multimedia enclosure of FIG. 17.

Referring now to FIG. 22, the installation and use of the alternative multimedia enclosure 211 with regard to a telecommunications network having a star configuration will be described. As the installation of a fiber optic cable 277 into the alternative multimedia enclosure 211 and the connection of that fiber optic cable 277 to either the storage bank 267 of the slack storage area 261 or the fiber optic cable adapters 255 of the optical network terminal 251 is similar to that described above with regard to the multimedia enclosure 11, it shall not be further described herein.

An incoming telephone cable 283 from a telecommunications network enters the alternative multimedia enclosure 211 through the cable trough 215 and into the interior region 225 of the housing 213 through the passage 231. In the subject embodiment, the incoming telephone cable 283 includes five-pairs of wires 283a-e. Each pair of wires 283a-e is inserted into the terminal clips 245 in one of the IDCs 243a-f in the first termination block 233a. The terminal clip 245a-d into which each wire in the pair of wires 283a-e is inserted is selected based on the wiring requirements of the connector port 241.

Each outgoing telephone cable 287a-f includes a pair of wires with a connectorized end, which is adapted to fit the connector port 241a-f in the first termination block 233a, disposed on at least one end of the outgoing telephone cable 287a-f. Each outgoing telephone cable 287a-f exits the alternative multimedia enclosure 211 en route to an end location in the residence. With the connectorized end of the outgoing telephone cable 287 inserted into the connector port 241a-f that is in communication with the incoming telephone cable 283 through the corresponding IDC 243, the outgoing telephone cable 287 is active. If only one pair of wires in the incoming telephone cable 283 is active, additional connector ports 241a-f can be made active by using a jumper cable 293 to connect the corresponding terminal clips 245a-d in adjacent IDCs 243.

A patch cable 285 having one connectorized end and an exposed wire end is used to connect the data/telephone output ports 257 of the optical network terminal 251 to the first and second termination blocks 233a, 233b. The connectorized end of the patch cable 285 is connectedly engaged with the data/telephone output ports 257 in the optical network terminal 251 while the exposed wire end is either mounted in the IDC 243 of the first termination block 233a or soldered to the solder mounting pads of the second termination block 233b. If the patch cable 285 is connected to the second termination block 233b, a connectorized end of an outgoing data cable 289 is connected to the data connector port 240 of the second termination block 233b. The outgoing data cable 289 exits the alternative multimedia enclosure 211 en route to an end location in the residence.

An outgoing video cable 291, which is connected to the video output 259 on the optical network terminal 251, passes through an opening 292 in the second sidewall 223 and exits the alternative multimedia enclosure 211 through the cable trough 215. In the alternative, a video splitter having a plurality of video ports may be mounted to the housing 213, with a video patch cable connecting the video splitter to the video output 259 of the optical network terminal 251.

Figure 23:
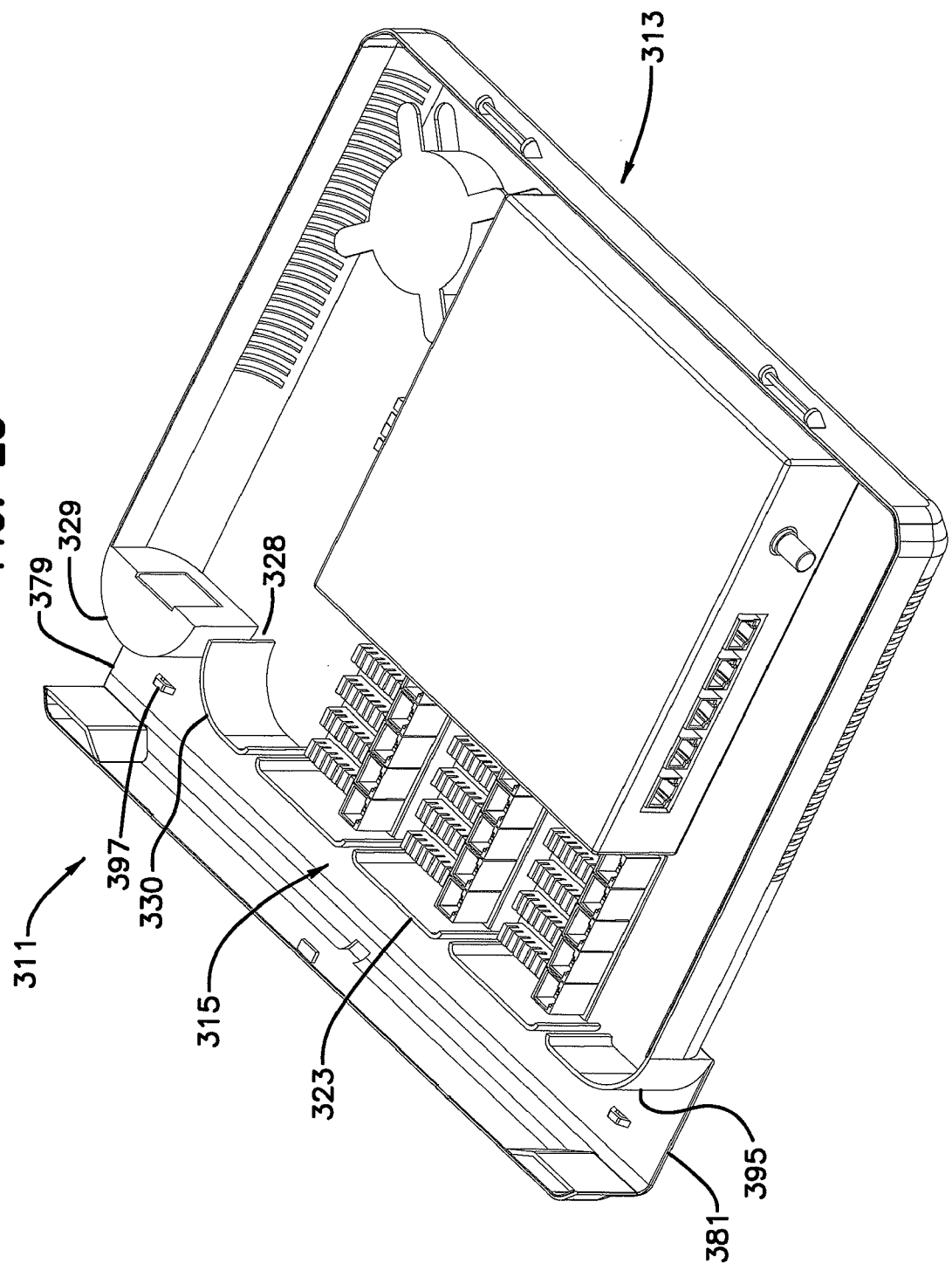
FIG. 23 is a perspective view of a housing of an alternative embodiment of a multimedia enclosure having features that are examples of aspects in accordance with the principles of the present disclosure.
Figure 24:
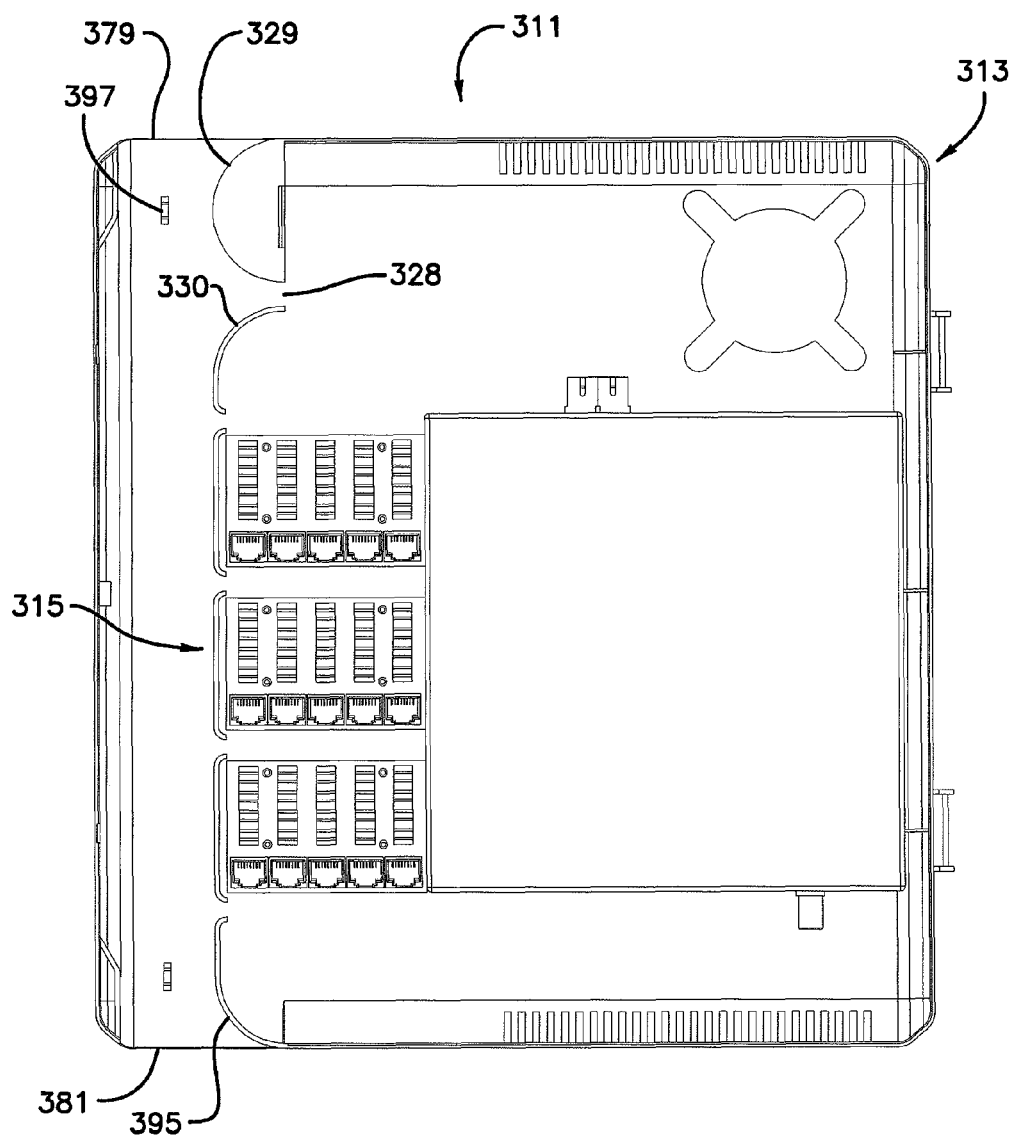
FIG. 24 is a front view of the housing of the alternative embodiment of the multimedia enclosure of FIG. 23.

Referring now to FIGS. 23 and 24, an alternative embodiment of a multimedia enclosure 311 will be described. The alternative embodiment of the multimedia enclosure 311 includes a housing, generally designated 313, a cable trough, generally designated 315, and a cover (not shown). The housing 313 includes a first sidewall 321 and an oppositely disposed second sidewall 323. The cable trough 315 is disposed adjacent to the second sidewall 323. The cable trough 315 is defined by the second sidewall 323 and a trough wall 327, which is oppositely disposed from the second sidewall 323. The cable trough 315 includes a first end 379 and an oppositely disposed second end 381. Fiber optic cables enter the housing 313 from the cable trough 315 through a fiber passage 328. The fiber passage 328 is defined by first and second radius limiters 329, 330, respectively, disposed on the second sidewall 323. In the subject embodiment, the first radius limiter 329 is shaped as a half circle having a radius which is greater than the minimum bend radius of the fiber optic cables. The second radius limiter 330 is shaped as a quarter circle having a radius that is about equal to the radius of the first radius limiter. A third radius limiter 395 is disposed on the second sidewall 323 near the second end 381 of the cable trough 315. In the subject embodiment, the third radius limiter 395 has a quarter circle shape with a radius that is greater than the minimum bend radius of the fiber optic cable. As the first radius limiter 329 protects fiber optic cables from attenuation resulting from severe bending of the fiber optic cable as the fiber optic cable enters the first end of the cable trough 315, the third radius limiter 395 similarly protects the fiber optic cables from attenuation as the fiber optic cable enters the second end 381 of the cable trough 315.

Cable tie loops 397 are disposed in the cable trough 315 near the first end 379 and the second end 381. The cable tie loops are used to secure incoming and outgoing cables to the cable trough 315. The cable tie loops 397 are loops disposed in the cable trough 315 that have an opening through which a cable tie (not shown) can be anchored to the cable trough 315.

Figure 25:
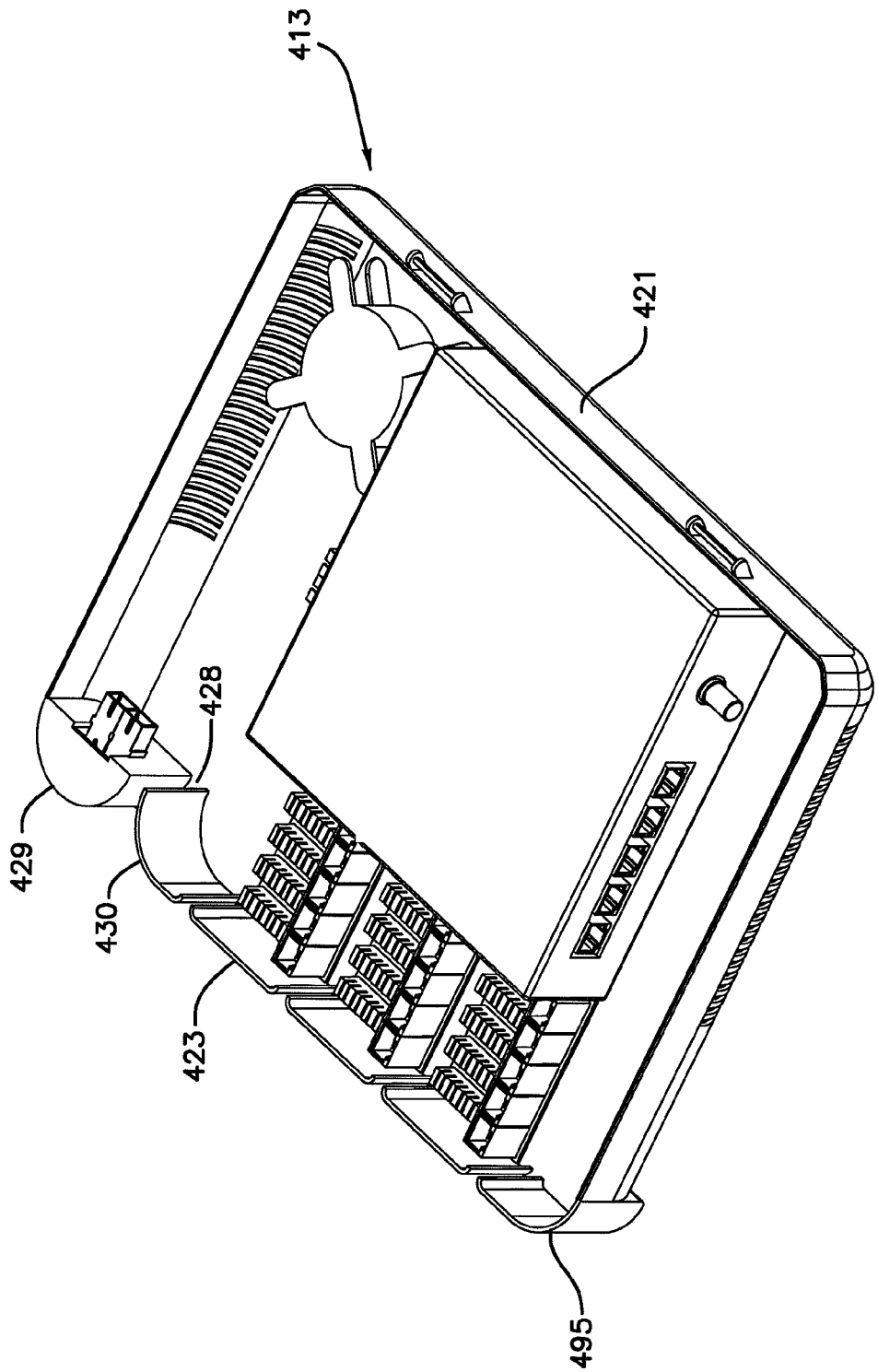
FIG. 25 is a perspective view of a housing of an alternative embodiment of a multimedia enclosure having features that are examples of aspects in accordance with the principles of the present disclosure.
Figure 26:
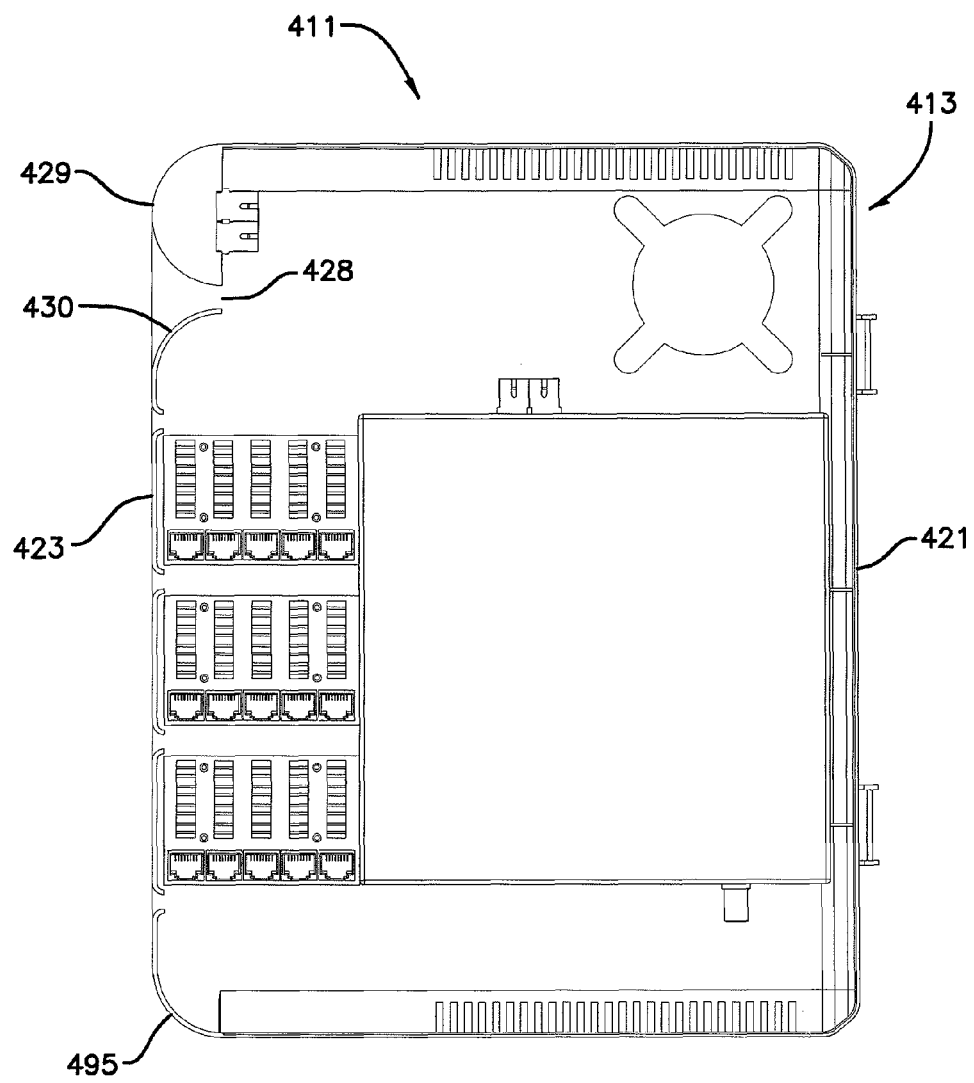
FIG. 26 is a front view of the housing of the alternative embodiment of the multimedia enclosure of FIG. 25.

Referring now to FIGS. 25 and 26, an alternate embodiment of a multimedia enclosure 411 will be described. The multimedia enclosure 411 includes a housing 413 having a first sidewall 421 and an oppositely disposed second sidewall 423. The second sidewall 423 includes a fiber passage 328 which is defined by a first and second radius limiter 429, 430. A third radius limiter 495 is oppositely disposed along the second sidewall 423 from the first radius limiter 429.

Referring now to FIGS. 27 and 28, an alternate embodiment of a multimedia enclosure 511 will be described. The multimedia enclosure 511 includes a housing, generally designated 513, a cable trough, generally designated 515, and a cover 517. The housing 513 includes a base 519, a first sidewall 521 and an oppositely disposed second sidewall 523. The base 519 and the first and second sidewall 521, 523 cooperatively define an interior region 525.

The cable trough 515 is disposed adjacent to the second sidewall 523. The cable trough 515 is defined by the second sidewall 523 and a trough wall 527, which is oppositely disposed from the second sidewall 523. The cable trough 515 includes a first end 579 and a second end 581. Fiber optic cables enter the housing 513 from the cable trough 515 through a fiber passage 528. The fiber passage 528 is defined by first and second radius limiters 529, 530, respectively, disposed on the second sidewall 323. Telephony and data cables enter and exit the housing 513 from the cable trough 515 through a plurality of passages 531 in the second sidewall 523.

The plurality of termination blocks 33a, 33b, 33c is mounted in the interior region 525 of the housing 513. Each termination block 33 includes the plurality of connector ports 41 and the plurality of IDCs 43. The IDCs 43 are mounted the distance D (shown in FIG. 7) from the connector ports 41, thereby forming the path 42 (shown in FIG. 7) between the plurality of IDCs and the plurality of connector ports 41. The termination blocks 33 are mounted in the housing 513 such that the path 42 in the termination block is aligned with the passage 31 in the second sidewall 523.

A third radius limiter 595 is disposed on the second sidewall 523 near the second end 581 of the cable trough 515. Cable tie loops 597, which are used to secure incoming and outgoing cables to the cable trough 515, are disposed in the cable trough 515 near the first end 579 and the second end 581.

In the subject embodiment, the cover 517 encloses the interior region 525 and the cable trough 517 when the cover is in the closed position (FIG. 27). The cover 517 includes a latch mechanism 518 which selectively engages a catch 520 disposed on the trough wall 527.

One of the many potential advantages of the subject embodiment concerns the flexibility of the multimedia enclosure. As stated, the multimedia enclosure supports residential communication networks configured in the standard daisy chain configuration or the star configuration. Therefore, the multimedia enclosure 11 can be used in existing residences, as well as new constructions.

Another potential advantage of the subject embodiment concerns the location of the optical network terminal 51. Typically, optical network terminals 51 are mounted outside of the subscriber's residence. However, the multimedia enclosure 11 provides a location for the optical network terminal 51 inside the subscriber's residence which makes it more easily accessible by technicians. In addition to easier accessibility, by locating the optical network terminal 51 in the multimedia enclosure 11 in the subscriber's residence, the optical network terminal 51 does not need to be installed until after the need for the optical network terminal 51 arises since the optical network terminal 51 can be quickly connected by patch cables 85.

A further potential advantage of the subject embodiment concerns the protection of the fiber optic cable 77 from attenuation resulting from bending of the fiber optic cable 77. As previously described, the multimedia enclosure 11 includes the first and second radius limiters 29, 30 and the cable management spool 63 which protect the fiber optic cable 77 from exceeding the minimum bend radius limit of the fiber optic cable 77.

Various modifications and alterations of this disclosure will become apparent to those skilled in the art without departing from the scope and spirit of this disclosure, and it should be understood that this disclosure is not to be unduly limited to the illustrative embodiments set forth herein.

What is claimed is:

1. A multimedia enclosure comprising:
   a housing having a base, a first sidewall and a second sidewall oppositely disposed from the first sidewall, wherein the base and the first and second sidewalls define an interior region having an optical network terminal mounting area;
   a first radius limiter disposed on the second sidewall, the first radius limiter having a first convex portion;
   a second radius limiter disposed on the second sidewall, the second radius limiter having second convex portion, the first and second radius limiters cooperatively defining a fiber passage that provides a path through the second sidewall and into the interior region;
   a termination block disposed in the interior region of the housing, wherein the termination block includes a plurality of inputs and a plurality of outputs; and
   an optical network terminal disposed in the optical network terminal mounting area of the interior region of the housing, the optical network terminal having a main housing that includes a fiber optic cable adapter, a data/telephony output and a video output.

2. A multimedia enclosure as claimed in claim 1, wherein the second sidewall includes a plurality of passages.

3. A multimedia enclosure as claimed in claim 1, further comprising a cover connectedly engaged with the housing for selectively covering the interior region of the housing.

4. A multimedia enclosure as claimed in claim 1, further comprising a cable trough disposed between the second sidewall and a trough wall outside the interior region of the housing.

5. A multimedia enclosure as claimed in claim 4, further comprising a video port disposed in the housing.

6. A multimedia enclosure as claimed in claim 5, wherein the video port is disposed in the second sidewall of the housing.

7. A multimedia enclosure as claimed in claim 1, wherein the housing defines a plurality of vent passages.

8. A multimedia enclosure as claimed in claim 1, further comprising a wireless router mounted to the base in the interior region of the housing.

9. A multimedia enclosure as claimed in claim 1, wherein two termination blocks are disposed in the interior region of the housing.

10. A multimedia enclosure as claimed in claim 9, wherein one of the two termination blocks includes at least one connector port and at least one insulation displacement connector in electrical communication with the at least one connector port, and the other termination block includes at least one connector port and at least one solder mounting pad in electrical communication with the at least one connector port.

11. A multimedia enclosure as claimed in claim 10, wherein the at least one connector port in the two termination blocks is accessible through openings in the second sidewall.

12. A multimedia enclosure as claimed in claim 1, wherein three termination blocks are disposed in the interior region of the housing.

13. A multimedia enclosure as claimed in claim 12, wherein each of the three termination blocks includes at least one connector port and at least one insulation displacement connector in electrical communication with the at least one connector port.

14. A multimedia enclosure as claimed in claim 13, wherein the at least one connector port is adapted to receive RJ45 connectors.

15. A multimedia enclosure comprising:
a housing having a base, a first sidewall and a second sidewall oppositely disposed from the first sidewall, wherein the base and the first and second sidewalls define an interior region having a optical network termination mounting area;
a first radius limiter disposed on the second sidewall, the first radius limiter having a first convex portion;
a second radius limiter disposed on the second sidewall, the second radius limiter having second convex portion, the first and second convex portions of the first and second radius limiters cooperatively defining a fiber passage that provides a path through the second sidewall and into the interior region;
a third radius limiter disposed on the second sidewall opposite the first radius limiter;
a cover connectedly engaged with the first sidewall of the housing for selectively covering the interior region of the housing;
a cable trough in connected engagement with the second sidewall of the housing and disposed outside of the interior region, wherein a plurality of passages is disposed in the second sidewall for providing a path between the cable trough and the interior region;
a termination block mounted to the base of the housing in the interior region, wherein the termination block includes at least one connector port and at least one insulation displacement connector in electrical communication with the at least one connector port; and
an optical network terminal mounted to the optical network termination mounting area of the interior region of the base, the optical network terminal having a main housing that includes a fiber optic cable adapter, a data/telephony output and a video output.

16. A multimedia enclosure as claimed in claim 15, further comprising a wireless router mounted to the base of the interior region of the housing.

17. A multimedia enclosure assembly comprising:
a housing having a base, a first sidewall, and a second sidewall oppositely disposed from the first sidewall, wherein the base and the first and second sidewalls define an interior region having a slack storage area and an optical network terminal mounting area;
a cable management spool mounted to the base and disposed in the slack storage area of the interior region of the housing;
a storage bank disposed in the slack storage area of the interior region, wherein the storage bank includes an adapter adapted to receive a connectorized end of a fiber optic cable;
a plurality of termination blocks mounted to the base and disposed in the interior region of the housing adjacent to the slack storage area and the optical network terminal mounting area, wherein the plurality of termination blocks includes a plurality of inputs and a plurality of outputs;
a cable trough in connected engagement with the housing and disposed adjacent to the interior region; and
a trough cover that selectively encloses the cable trough.

18. A multimedia enclosure assembly as claimed in claim 17, further comprising a cover connectedly engaged with the housing for selectively covering the interior region of the housing.

19. A multimedia enclosure assembly as claimed in claim 17, further comprising a first radius limiter and a second radius limiter with each of the first and second radius limiters disposed on the second sidewall, wherein the first and second radius limiters define a fiber passage into the slack storage area of the interior region.

20. A method for installing a multimedia enclosure comprising steps of:
mounting a housing defining an interior region of a multimedia enclosure to a wall;
routing a fiber optic cable into a cable trough of the multimedia enclosure, wherein the cable trough is disposed adjacent to the interior region of the housing;
routing the fiber optic cable through a fiber passage and into the interior region of the housing, wherein the fiber passage is cooperatively defined by a first convex portion of a first radius limiter and a second convex portion of a second radius limiter of the housing;
routing an incoming telephony cable into the cable trough and into the interior region of the housing, wherein the incoming telephony cable is engaged to a termination block;
routing an outgoing telephony cable from the interior region into the cable trough, wherein the outgoing telephony cable is in communication with the incoming telephony cable; and
routing an outgoing data cable that is in communication with the fiber optic cable from the interior region into the cable trough.

21. A multimedia enclosure comprising:
a housing having a base, a first sidewall and a second sidewall oppositely disposed from the first sidewall, wherein the base and the first and second sidewalls define an interior region;
an optical network terminal mounting area disposed on the base of the housing in the interior region; and
a first radius limiter disposed on the second sidewall, the first radius limiter having a first convex portion;
a second radius limiter disposed on the second sidewall, the second radius limiter having second convex portion, the first and second convex portions of the first and second radius limiters cooperatively defining a fiber passage that provides a path through the second sidewall and into the interior region of the housing.

22. A multimedia enclosure as claimed in claim 21, further comprising a cable trough disposed between the second side wall and a trough wall, wherein the fiber passage provides the path between the cable trough and the interior region of the housing.

23. A multimedia enclosure as claimed in claim 22, wherein the cable trough is disposed outside of the interior region of the housing.

24. A multimedia enclosure as claimed in claim 22, further comprising a cover connectedly engaged with the housing for selectively covering the interior region of the housing.

25. A multimedia enclosure as claimed in claim 24, wherein the cover selectively covers the cable trough.

* * * * *